(12) United States Patent
Tauchi et al.

(10) Patent No.: US 8,244,425 B2
(45) Date of Patent: Aug. 14, 2012

(54) IN-VEHICLE APPARATUS

(75) Inventors: Nobutaka Tauchi, Toyoake (JP); Tetsuya Oki, Nagoya (JP)

(73) Assignee: Denso Corporation, Kariya (JP)

( * ) Notice: Subject to any disclaimer, the term of this patent is extended or adjusted under 35 U.S.C. 154(b) by 463 days.

(21) Appl. No.: 12/461,037

(22) Filed: Jul. 30, 2009

(65) Prior Publication Data

US 2010/0030422 A1 Feb. 4, 2010

(30) Foreign Application Priority Data

Aug. 1, 2008 (JP) ................................. 2008-199924

(51) Int. Cl.
*G01C 21/00* (2006.01)

(52) U.S. Cl. ....................................... 701/29.1; 701/408

(58) Field of Classification Search ..................... 701/29, 701/34, 207, 29.1, 408
See application file for complete search history.

(56) References Cited

U.S. PATENT DOCUMENTS

| | | | |
|---|---|---|---|
| 7,284,408 B2 | 10/2007 | Kato | |
| 2002/0158754 A1 | 10/2002 | Tabata et al. | |
| 2004/0204798 A1* | 10/2004 | Imada et al. | 701/1 |
| 2005/0060069 A1* | 3/2005 | Breed et al. | 701/29 |
| 2007/0067096 A1* | 3/2007 | Ohkubo et al. | 701/207 |
| 2007/0078594 A1* | 4/2007 | Mori | 701/207 |
| 2007/0192003 A1 | 8/2007 | Hashiba | |
| 2010/0332135 A1* | 12/2010 | Toda | 701/216 |

FOREIGN PATENT DOCUMENTS

| | | |
|---|---|---|
| JP | A-2001-280984 A | 10/2001 |
| JP | A-2007-230696 A | 9/2007 |

OTHER PUBLICATIONS

Office Action dated Jun. 22, 2010 from the Japan Patent Office in corresponding JP Application No. 2008-199924 (and English translation).

* cited by examiner

*Primary Examiner* — Behrang Badii
*Assistant Examiner* — Shardul Patel
(74) *Attorney, Agent, or Firm* — Posz Law Group, PLLC

(57) ABSTRACT

A navigation apparatus carries out a diagnosing process for vehicle behavior, for example, whether sudden accelerating operation or sudden braking operation has been done, wherein the diagnosing process is carried out based on vehicle acceleration. It is necessary to accurately calculate the vehicle acceleration in order to perform a reliable diagnosing process. The navigation apparatus calculates a difference between a first vehicle acceleration defined by an output from an acceleration sensor and a second vehicle acceleration calculated based on a vehicle speed and vehicle angular speed. The navigation apparatus carries out the diagnosing process, for example, when the above difference between the first and second vehicle accelerations is less than a predetermined value.

17 Claims, 10 Drawing Sheets

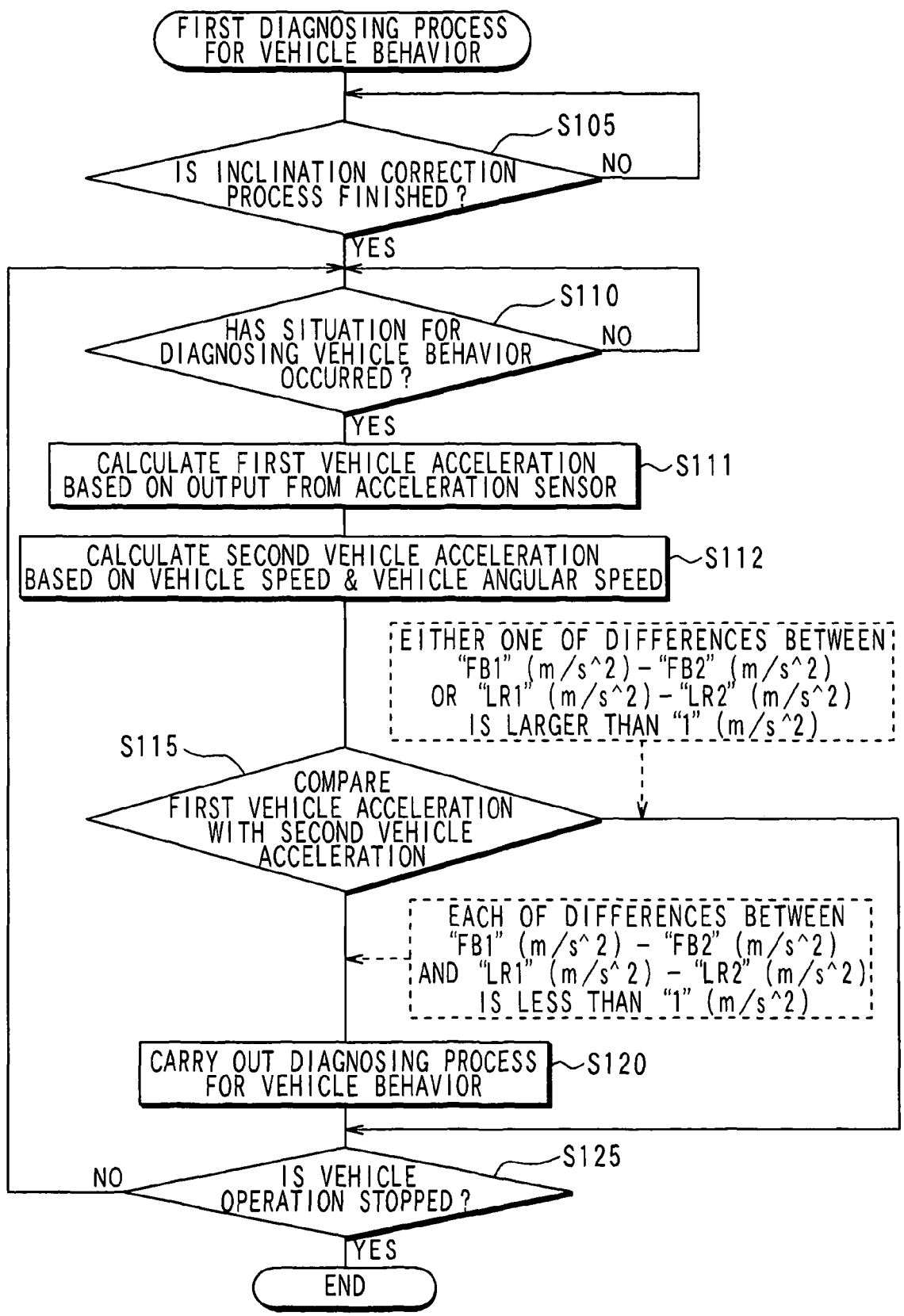

IN-VEHICLE APPARATUS

CROSS REFERENCE TO RELATED APPLICATION

This application is based on Japanese Patent Application No. 2008-199924 filed on Aug. 1, 2008, the disclosure of which is incorporated herein by reference.

FIELD OF THE INVENTION

The present invention relates to an in-vehicle apparatus, such as a vehicle navigation apparatus, according to which a vehicle control process, for example, a diagnosing process for vehicle behavior is carried out by use of vehicle acceleration.

BACKGROUND OF THE INVENTION

Recently, social concern has been increased against global environment problems, such as global warming. Activities for the global environment problems have become one of important social missions for automotive related companies, in addition to activities for improvements of automotive safety. In view of the above problems, it is under review to provide such services, according to which points are given to a vehicle driver depending on driver's contributions to traffic safety, the global environment problems, and so on. And a ranking of the drivers, discounts when buying a new car, and other services are provided to the driver depending on an accumulating total of the points. It is necessary to determine how much the driver's behavior has been contributing to the traffic safety and the global environment problems, when the above services will be provided. The following diagnoses may be possible to determine the above driver's contribution; that is, a diagnosis for determining whether driver's steering operating was smoothly done, a diagnosis for determining whether the driver drove the vehicle safely on a curved road, a diagnosis for determining whether sudden acceleration was not done, a diagnosis for determining whether a braking operation was suddenly carried out, and so on.

The above diagnoses may be carried out by determining whether vehicle acceleration in a vehicle longitudinal direction or in a vehicle transverse direction exceeds a predetermined value. The vehicle acceleration may be a detected value (that is, an output value) of an acceleration sensor mounted in a vehicle for a navigation apparatus. In the case that the navigation apparatus having the acceleration sensor is mounted in the vehicle in an inclined condition with respect to a horizontal line, errors may be generated in an output value of the acceleration sensor due to gravity.

Accordingly, the navigation apparatus defines the vehicle acceleration through correction for the output value of the acceleration sensor by taking the inclination of the navigation apparatus into consideration. Even if the output value of the acceleration sensor is corrected in the case that the navigation apparatus is mounted in the vehicle in the inclined condition, errors may be still generated in the detected value of the acceleration sensor due to influence of acceleration in the vertical direction, which would be caused by vibration in the vertical direction when the vehicle runs on a punishing road. Furthermore, even if the navigation apparatus is mounted in the vehicle in a horizontal condition, errors may be still generated in the detected value of the acceleration sensor due to gravity, when the vehicle runs on a sloping road.

Accordingly, it is necessary to determine whether any errors are generated in the detected value of the acceleration sensor, in order to accurately carry out a certain vehicle control process for vehicle operation, such as a diagnosing process for vehicle behavior performed by a vehicle driver, based on vehicle acceleration.

Japanese Patent Publication No. 2001-328580 (hereinafter referred to as a first patent publication) discloses an automatic transmitting apparatus for a traffic accident, according to which an occurrence of a traffic accident of a motor cycle is detected without using an acceleration sensor. According to the automatic transmitting apparatus of the first patent publication, a control portion determines that the accident has occurred for the motor cycle, when an inclination angle (having an angle larger than a predetermined value) detected by an inclination sensor mounted on the motor cycle is continuously outputted for a period more than a predetermined value. Then, the automatic transmitting apparatus transmits information of a possible accident to a predetermined traffic information center. However, the first patent publication does not disclose a method for determining whether there is an error generated in a detected value for vehicle acceleration, which is outputted from an acceleration sensor.

Japanese Patent Publication No. 2007-246076 (hereinafter referred to as a second patent publication) discloses a movement control apparatus for controlling vehicle behavior and so on. The movement control apparatus prohibits its control, when an inclination of the apparatus with respect to a horizontal line is changed from an initial position, and informs a vehicle driver that a position of the apparatus mounted in a vehicle is not in a good condition.

According to the movement control apparatus according to the second patent publication, it is regarded that error may be generated in detected amount of acceleration, when the inclination of the apparatus is changed from the initial position. Then, the control to be carried out by the movement control apparatus is prohibited. However, the movement control apparatus can not stop its control, when error is generated in the detected amount, for example, in the detected acceleration, due to reasons other than the inclination of the apparatus. For example, when a vehicle is running on a punishing road and thereby vibration is generated in the vertical direction, or when the vehicle is running on a sloping road, the movement control apparatus does not prohibit its control function.

SUMMARY OF THE INVENTION

The present invention is made in view of the above problems. It is an object of the present invention to provide an in-vehicle apparatus, according to which a vehicle control process (for example, a diagnosing process) is not carried out based on detected acceleration, when accuracy of the detected acceleration of an acceleration sensor is not in a good condition.

(S1) According to a feature of the invention, an in-vehicle apparatus (for example, a vehicle navigation apparatus) defines vehicle acceleration in a horizontal direction based on an output from an acceleration sensor mounted in a vehicle, and carries out a vehicle control process (for example, a diagnosing process for vehicle behavior) based on the vehicle acceleration defined as above. The in-vehicle apparatus has a first acceleration defining portion for defining a first vehicle acceleration in the horizontal direction based on the output from the acceleration sensor; a speed defining portion for defining a vehicle speed; an angular speed defining portion for defining a vehicle angular speed; and a second acceleration defining portion for defining a second vehicle acceleration in the horizontal direction based on the vehicle speed and the vehicle angular speed. Furthermore, the in-vehicle apparatus has a determining portion for determining whether the first acceleration defining portion is in a condition for accurately defining the first vehicle acceleration in the horizontal direction by use of the output from the acceleration sensor, based on the first and second vehicle accelerations.

An acceleration sensor is generally used to define a vehicle acceleration. However, in the case that the apparatus having the acceleration sensor is mounted in the vehicle in an inclined condition, in the case that vibration in the vertical direction is generated in the vehicle, in the case that the vehicle is running on a sloping road, or the like, there may exist such a situation in which the acceleration sensor can not accurately define the vehicle acceleration.

It is possible to detect an angular speed of the vehicle by use of a well-known gyroscope. It is also possible to define a vehicle acceleration based on the vehicle angular speed detected by the gyroscope and a vehicle speed calculated from a vehicle-speed pulse.

According to the above mentioned feature of the invention, the in-vehicle apparatus determines about accuracy of the (first) vehicle acceleration defined by the output of the acceleration sensor, based on the first vehicle acceleration defined by the output of the acceleration sensor and the second vehicle acceleration defined by the vehicle speed and the vehicle angular speed. More specifically, the in-vehicle apparatus determines that the vehicle acceleration defined by the output of the acceleration sensor is not in an accurate condition, when a difference between the (first) vehicle acceleration defined by the output of the acceleration sensor and the (second) vehicle acceleration defined by the vehicle speed and vehicle angular speed is larger than a predetermined value.

According to such feature, the in-vehicle apparatus avoids a situation, in which the vehicle control process (e.g. the diagnosing process) to be carried out based on the vehicle acceleration would be carried out even in spite that the vehicle acceleration defined by the output of the acceleration sensor is not in the accurate condition.

As a result, in the case that the in-vehicle apparatus carries out the diagnosing process for vehicle behavior based on the vehicle acceleration defined by the output of the acceleration sensor, it is possible to avoid the diagnosing process, which would be carried out based on the vehicle acceleration, the accuracy of which is not in the good condition.

A vehicle speed is generally defined by vehicle-speed pulses, which are generated in accordance with rotational speed of a vehicle axle. It may take a longer time period when the vehicle acceleration is defined based on the vehicle speed and vehicle angular speed, compared with a case in which the vehicle acceleration is defined by the output of the acceleration sensor. Accordingly, it is possible to define the vehicle acceleration at a higher frequency in the case that the vehicle acceleration is defined by the output of the acceleration sensor, than the case in which the vehicle acceleration is defined based on the vehicle speed. Therefore, the acceleration sensor is generally used to define the vehicle acceleration.

(S2) Measurement errors may be generated in the output from the acceleration sensor by vibration, which may be generated when the vehicle runs on a punishing road, or when the vehicle runs over cat's eyes provided on a road. In particular, when the apparatus having the acceleration sensor is mounted in the vehicle in the inclined condition, the measurement errors are more likely to be generated in the output from the acceleration sensor due to the acceleration in the vertical direction caused by the vibration during the vehicle runs on the punishing road.

Therefore, according to another feature of the invention, the in-vehicle apparatus has an acceleration defining portion for defining a vehicle acceleration in a horizontal direction based on an output from an acceleration sensor mounted in a vehicle, and a determining portion for determining, whether the acceleration defining portion is in a condition for accurately defining the vehicle acceleration in the horizontal direction based on the output from the acceleration sensor, based on a rate of change of the vehicle acceleration in the horizontal direction defined by the output from the acceleration sensor.

According to such feature, the in-vehicle apparatus determines that the accuracy of the vehicle acceleration defined by the output from the acceleration sensor becomes worse due to vibration to be caused when the vehicle runs on the punishing road, in the case that rate of change of the vehicle acceleration defined by the output from the acceleration sensor is larger than a predetermined value. As a result, the in-vehicle apparatus avoids such a case, in which the vehicle control process to be carried out based on the vehicle acceleration would be performed.

(S3) When the vehicle is running on a sloping road, a position of the in-vehicle apparatus having the acceleration sensor is inclined. As a result, measurement errors may be generated in the output of the acceleration sensor due to the influence of the gravity.

Therefore, according to a further feature of the present invention, the in-vehicle apparatus has an acceleration defining portion for defining a vehicle acceleration in a horizontal direction based on an output from an acceleration sensor mounted in a vehicle, and a slope defining portion for defining a slope of a road on which the vehicle is running. The in-vehicle apparatus further has a determining portion for determining, whether the acceleration defining portion is in a condition for accurately defining the vehicle acceleration in the horizontal direction based on the output from the acceleration sensor, based on the slope of the road defined by the slope defining portion.

The above slope defining portion may define the slope of the road on which the vehicle is running, based on a current position of the vehicle and map data.

According to such feature, the in-vehicle apparatus determines that the accuracy of the vehicle acceleration defined by the output from the acceleration sensor becomes worse, when the vehicle is running on the sloping road. And the in-vehicle apparatus avoids such a case, in which the vehicle control process to be carried out based on the vehicle acceleration would be performed.

(S4) Measurement errors are likely to be generated in the output of the acceleration sensor due to vibration in the vertical direction, when the vehicle is running on the punishing road.

Therefore, according to a still further feature of the present invention, the in-vehicle apparatus has an acceleration defining portion for defining a vehicle acceleration in a horizontal direction based on an output from an acceleration sensor mounted in a vehicle; and a road-surface defining portion for defining a surface condition of a road on which the vehicle is running. The in-vehicle apparatus further has a determining portion for determining, whether the acceleration defining portion is in a condition for accurately defining the vehicle acceleration in the horizontal direction based on the output from the acceleration sensor, based on the surface condition of the road defined by the road-surface defining portion.

The road-surface defining portion may define the surface condition of the road, based on the map data. In addition, the road-surface defining portion may define the surface condition of the road, based on information obtained from an external system and/or image information of a camera.

According to such feature, the in-vehicle apparatus determines that the accuracy of the vehicle acceleration defined by the output from the acceleration sensor is not in the good condition, when the vehicle is running on the road, for example, which is not paved or on which a construction is going on. Therefore, the in-vehicle apparatus avoids such a case, in which the vehicle control process to be carried out based on the vehicle acceleration would be performed.

(S5) In the in-vehicle apparatus having the acceleration sensor, a correction data is generally made for vehicle inclination, and the output of the acceleration sensor is corrected based on the correction data, in order to accurately define the vehicle acceleration. Accordingly, it is rather difficult to accurately define the vehicle acceleration until such correction data is made, in the case that the in-vehicle apparatus is mounted in the vehicle in the inclined condition.

Therefore, according to a further feature of the present invention, the in-vehicle apparatus has an acceleration defining portion for defining a vehicle acceleration in a horizontal direction based on an output from an acceleration sensor mounted in a vehicle, and a correction data calculating portion for preparing correction data to correct measurement errors included in the output from the acceleration sensor, wherein the measurement errors may be generated due to a situation in which the acceleration sensor is mounted in the vehicle in an inclined condition. And the in-vehicle apparatus further has a determining portion for determining that the acceleration defining portion is not in a condition for accurately defining the vehicle acceleration in the horizontal direction based on the output from the acceleration sensor, when the correction data is not prepared by the correction data calculating portion.

According to such feature, the in-vehicle apparatus determines that the accuracy of the vehicle acceleration defined by the output from the acceleration sensor is not in the good condition, until the correction data is prepared for the inclination of the in-vehicle apparatus. Therefore, the in-vehicle apparatus avoids such a case, in which the vehicle control process to be carried out based on the vehicle acceleration would be performed.

(S6) As explained above, it takes a longer time when the vehicle acceleration is defined based on the vehicle speed and vehicle angular speed, compared with a case in which the vehicle acceleration is defined by the output of the acceleration sensor. Accordingly, it is possible to define the vehicle acceleration at a higher frequency in the case in which the vehicle acceleration is defined by the output of the acceleration sensor, than the case in which the vehicle acceleration is defined based on the vehicle speed. On the contrary, in the case the vehicle acceleration is defined based on the vehicle speed, the vehicle acceleration can not be defined at a sufficient level of the frequency when compared with the case in which the vehicle acceleration is defined by the output of the acceleration sensor. As a result, the accuracy of the process may become worse.

However, the in-vehicle apparatus may temporarily carry out the vehicle control process based on the vehicle acceleration defined by the vehicle speed instead of the vehicle acceleration defined by the output of the acceleration sensor.

Therefore, according to a still further feature of the present invention, the in-vehicle apparatus has a first acceleration defining portion for defining a first vehicle acceleration in a horizontal direction based on an output from an acceleration sensor mounted in a vehicle; a vehicle speed defining portion for defining a vehicle speed; and a vehicle angular speed defining portion for defining a vehicle angular speed. The in-vehicle apparatus further has a second acceleration defining portion for defining a second vehicle acceleration in a horizontal direction based on the vehicle speed defined by vehicle speed defining portion and the vehicle angular speed defined by the vehicle angular speed defining portion, and a control portion for carrying out the vehicle control process based on the first vehicle acceleration in the horizontal direction, which is defined by the output from the acceleration sensor. In the above in-vehicle apparatus, the control portion carries out the vehicle control process based on not the first vehicle acceleration in the horizontal direction but the second vehicle acceleration in the horizontal direction, when a predetermined vehicle operating condition for the first and second vehicle accelerations is satisfied.

According to such feature, the in-vehicle apparatus selects one of the first and second vehicle accelerations, depending on the accuracy of the vehicle acceleration defined by the output of the acceleration sensor, or depending on the accuracy of the vehicle acceleration defined by the vehicle speed and vehicle angular speed. Then, the in-vehicle apparatus carries out the vehicle control process based on such selected vehicle acceleration.

(S7) The above predetermined vehicle operating condition for the first and second vehicle accelerations may be a condition for determining whether the first vehicle acceleration can be accurately defined based on the output from the acceleration sensor.

Therefore, according to a further feature of the invention, the in-vehicle apparatus may determine that the above predetermined vehicle operating condition is satisfied, when the first acceleration defining portion can not accurately define the vehicle acceleration in the horizontal direction based on the output from the acceleration sensor.

According to such feature, the in-vehicle apparatus can continuously carry out the vehicle control process without excessively and adversely affecting the accuracy of the vehicle control process, even in the case that the accuracy of the vehicle acceleration defined by the output from the acceleration sensor is not in the good condition.

(S8) In addition, the in-vehicle apparatus may determine the accuracy of the vehicle acceleration defined by the output of the acceleration sensor, in the following manner.

Namely, according to a further feature of the invention, the in-vehicle apparatus further has a first determining portion for determining, whether the first acceleration defining portion is in a condition for accurately defining the first vehicle acceleration in the horizontal direction by use of the output from the acceleration sensor, based on the first vehicle acceleration defined by the first acceleration defining portion and the second vehicle acceleration defined by the second acceleration defining portion. Then, the in-vehicle apparatus (the control portion thereof) determines that the above predetermined vehicle operating condition is satisfied, when the first determining portion determines that the first acceleration defining portion is not in a condition for accurately defining the first vehicle acceleration in the horizontal direction based on the output from the acceleration sensor, and the control portion carries out the vehicle control process (e.g. the diagnosing process) based on not the first vehicle acceleration in the horizontal direction but the second vehicle acceleration in the horizontal direction.

According to such feature, the in-vehicle apparatus determines that the accuracy of the vehicle acceleration defined by the output of the acceleration sensor is not in the good condition, when the difference between the first vehicle acceleration defined by the output of the acceleration sensor and the second vehicle acceleration defined by the vehicle speed and vehicle angular speed is larger than a predetermined value.

Then, the in-vehicle apparatus carries out the vehicle control process (e.g. the diagnosing process) based on not the first vehicle acceleration but the second vehicle acceleration. Accordingly, the in-vehicle apparatus can continuously carry out the vehicle control process without excessively and adversely affecting the accuracy of the vehicle control process, even in the case that the accuracy of the vehicle acceleration defined by the output from the acceleration sensor is not in the good condition.

(S9) As already explained above, the vehicle speed is generally defined by vehicle-speed pulses, which are generated in accordance with rotational speed of the vehicle axle. When the vehicle is running at a higher speed, a cycle for the vehicle-speed pulses becomes shorter, so that a time necessary for defining the vehicle speed based on the vehicle-speed pulses is accordingly made shorter. As a result, the vehicle speed becomes higher, the time necessary for defining the vehicle acceleration based on the vehicle speed and vehicle angular speed becomes shorter.

Therefore, according to a further feature of the present invention, the in-vehicle apparatus (that is, the control portion thereof) determines that the predetermined vehicle operating condition is satisfied, when the vehicle speed defined by the vehicle speed defining portion is higher than a predetermined value, namely when the vehicle acceleration in the horizontal direction can be defined at a predetermined frequency in case of defining the vehicle acceleration based on the vehicle speed and vehicle angular speed, and the control portion carries out the vehicle control process based on not the first vehicle acceleration in the horizontal direction but the second vehicle acceleration in the horizontal direction.

According to such feature, the in-vehicle apparatus can carry out the vehicle control process based on the vehicle acceleration defined by the vehicle speed, so long as the vehicle acceleration can be defined, by the vehicle speed based on the vehicle-speed pulses and the vehicle angular speed, at such a frequency necessary for the vehicle control process based on the vehicle acceleration. As a result, the in-vehicle apparatus carries out the vehicle control process without adversely affecting the accuracy for the process.

(S10) The in-vehicle apparatus may define the vehicle speed in the following manner. Namely, according to a feature of the invention, the vehicle speed defining portion defines the vehicle speed based on information from GPS.

Even according to such feature, the in-vehicle apparatus can define the vehicle acceleration based on the vehicle speed and vehicle angular speed.

BRIEF DESCRIPTION OF THE DRAWINGS

The above and other objects, features and advantages of the present invention will become more apparent from the following detailed description made with reference to the accompanying drawings. In the drawings:

FIG. 4 is a flow-chart showing a first diagnosing process for vehicle behavior according to a first embodiment;

DETAILED DESCRIPTION OF THE PREFERRED EMBODIMENTS

The present invention will be explained with reference to the drawings for respective embodiments. The present invention should not be limited to those embodiments, but may be modified in various manners so long as such modifications are within the scope of the invention.

First Embodiment (1) Structure of a Navigation Apparatus

Figure 1:
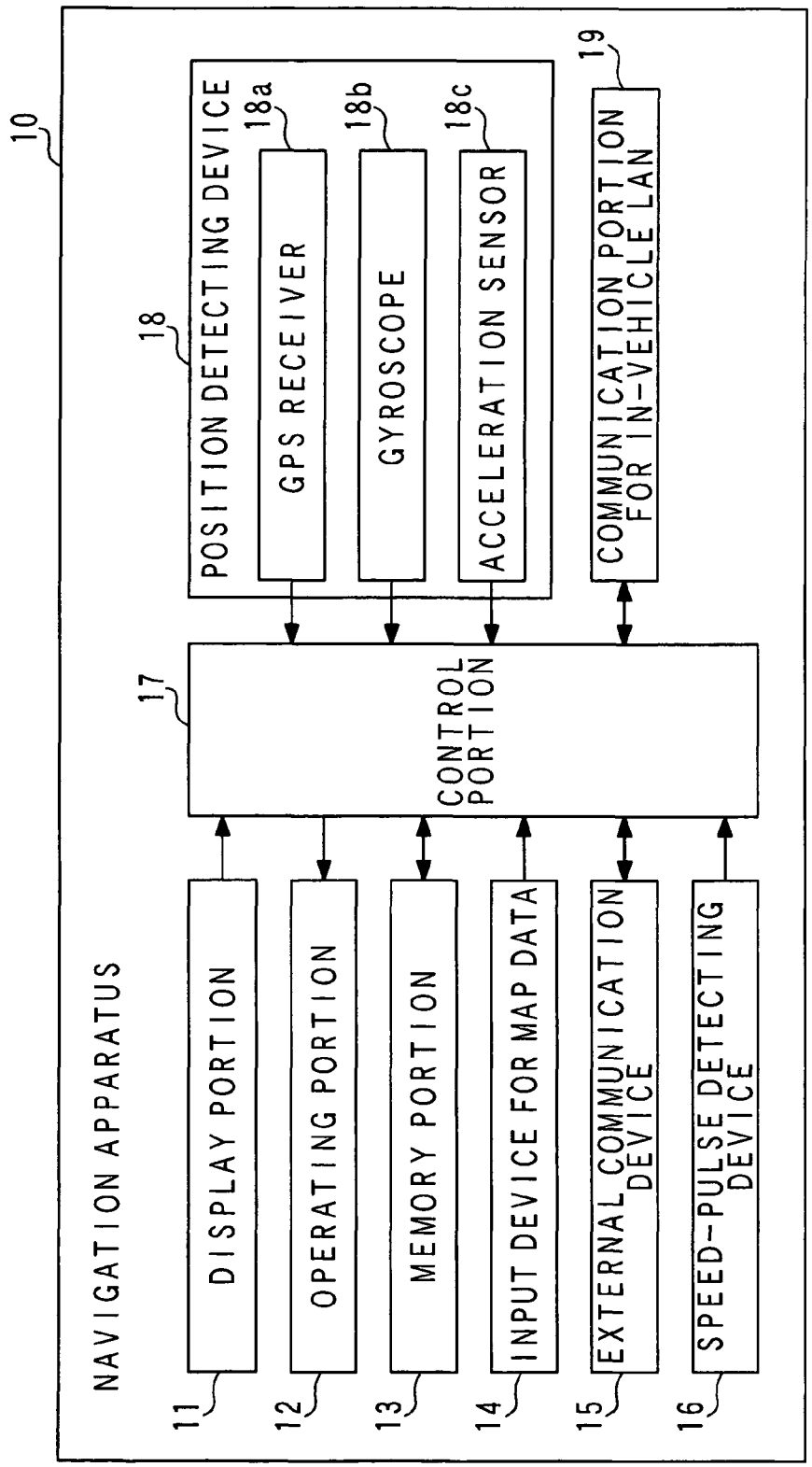
FIG. 1 is a block diagram showing a structure of a navigation apparatus.

FIG. 1 is a block diagram showing a structure of a navigation apparatus 10 (that is, an in-vehicle apparatus mounted in a vehicle) according to a first embodiment. The navigation apparatus 10 provides a well-known routing assistance and other functions. Furthermore, the navigation apparatus 10 performs determinations, such as a determination whether a steering operation has been smoothly carried out during vehicle travel, a determination whether a vehicle driver drove the vehicle safely on a curved road, a determination whether a sudden acceleration and/or a sudden braking operation was not done, and so on, so that the navigation apparatus 10 performs diagnoses for driving behaviors (that is, the vehicle behavior) of the vehicle driver based on those determinations. The navigation apparatus 10 is composed of a display portion 11, an operating portion 12, a memory portion 13, an input device 14 for map data, an external communication device 15, a speed-pulse detecting device 16 for vehicle speed pulses, a control portion 17, a position detecting device 18, and a communication portion 19 for in-vehicle LAN.

The display portion 11 is a portion for performing various kinds of displays and is composed of, for example, an LCD, an organic electroluminescence, and so on.

The operating portion 12 is a portion for receiving various instructions from a user (the vehicle driver) and is composed of, for example, a mechanical key switch, a touch-type switch, and so on.

The memory portion 13 is composed of a device (such as, HDD), for which a memory holding operation is not necessary, for memorizing various kinds of information.

The input device 14 of the map data is a device for inputting the map data to be used for the routing assistance, facilities searching information to be used when searching desired facilities, and other data. DVD-ROM or the like is generally used as a storage media for such data, because data volume thereof is massive. The map data, which are inputted via the input device 14, include information for a road width, information whether a road is paved or not, and other information related to roads defined by the map data.

The external communication portion 15 receives traffic information (including information for traffic accidents, traffic jam, and so on) from an information center (for example, a VICS information center) via optical beacons, radio-beam beacons and the like provided on road sides. In addition, the external communication portion 15 may obtain the traffic information from FM multiplex broadcasting.

The speed-pulse detecting device 16 for vehicle speed pulses is a portion for detecting vehicle speed pulses, which are signals corresponding to rotational speed of vehicle axle.

The control portion 17 is composed of a well-known micro-computer having CPU, ROM, RAM, I/O, and bus-lines for connecting them with each other. The control portion 17 is a portion for controlling various portions of the navigation apparatus 10 in accordance with programs stored in ROM. Furthermore, the control portion 17 defines vehicle speed, when receiving a predetermined number of vehicle speed pulses via the speed-pulse detecting portion 16.

The position detecting device 18 has a GPS receiver 18a, a gyroscope 18b and an acceleration sensor 18c, wherein the GPS receiver 18a receives electromagnetic wave from a satellite for GPS (Global Positioning System) via a GPS antenna (not shown) to thereby detect vehicle position, vehicle direction and vehicle speed. The gyroscope 18b detects a degree of rotational movement applied to the vehicle to thereby define angular speed of the vehicle. The acceleration sensor 18c detects vehicle acceleration. The gyroscope 18b and the acceleration sensor 18c are used to define a current position by an autonomous navigation. Since the GPS receiver 18a, the gyroscope 18b and the acceleration sensor 18c may include errors, which are dissimilar in characters, they are so composed as to supplement each other.

The communication portion 19 for the in-vehicle LAN is a portion for transmitting and receiving various kinds of information via the in-vehicle LAN (not shown).

(2) Acceleration Detected by the Acceleration Sensor

Acceleration detected by the acceleration sensor 18c, which constitutes the position detecting device 18 provided in the navigation apparatus 10, will be explained.

Figure 2:
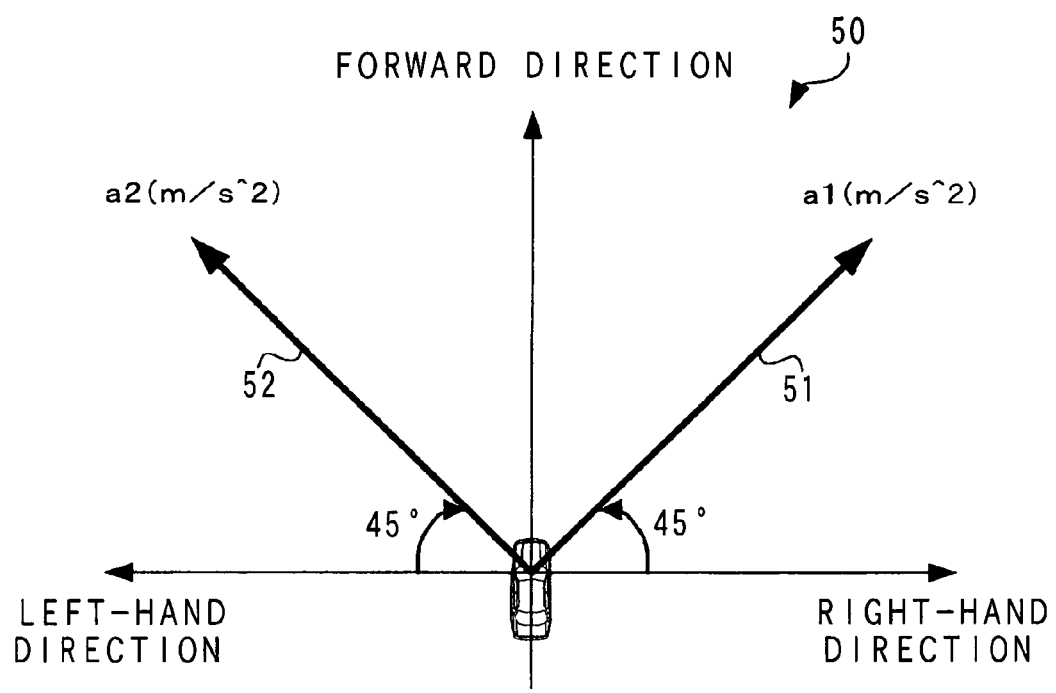
FIG. 2 is an explanation chart for explaining directions of accelerations applied to a vehicle, which are detected by an acceleration sensor 18c.

FIG. 2 shows an explanation chart 50 for explaining directions of accelerations applied to the vehicle, which are detected by the acceleration sensor 18c. The acceleration sensor 18c generates an output, that is, detected data "a1" (m/s ^2) of the acceleration, which is inclined at 45° in a right-hand side from a forward direction of the vehicle, and detected data "a2" (m/s ^2) of the acceleration, which is inclined at 45° in a left-hand side from the forward direction of the vehicle. An arrow 51 corresponds to the detected data "a1", whereas an arrow 52 corresponds to the detected data "a2". "S ^2" means here a square value of "S".

The control portion 17 corrects the detected data "a1" (m/s ^2) and "a2" (m/s ^2) for the vehicle acceleration in view of measurement errors which may be caused by an inclination of the position detecting device 18 (that is, the acceleration sensor 18c itself), to thereby calculate corrected values "A1" (m/s ^2) and "A2" (m/s ^2). The above correction will be explained below.

The control portion 17 defines vehicle acceleration in the longitudinal (front-back) direction of the vehicle and vehicle acceleration in the transverse (left-right) direction of the vehicle as in the following manner. Hereinafter, the vehicle acceleration in the longitudinal direction is also referred to as "FB1" (m/s ^2), and the vehicle acceleration in the transverse direction as "LR1" (m/s ^2).

"FB1"(m/s^2)="A1"(m/s^2)×sin(45°)+"A2"(m/s^2)× sin(45°)

"LR1"(m/s^2)="A1"(m/s^2)×cos(45°)+"A2"(m/s^2)× cos(45°)

(3) Measurement Errors of the Acceleration Sensor

In the case that the navigation apparatus 10 (in particular, the position detecting device 18) is mounted in the vehicle in an inclined condition, errors may appear in the detected data of the acceleration detected by the acceleration sensor 18c.

Figure 3A:
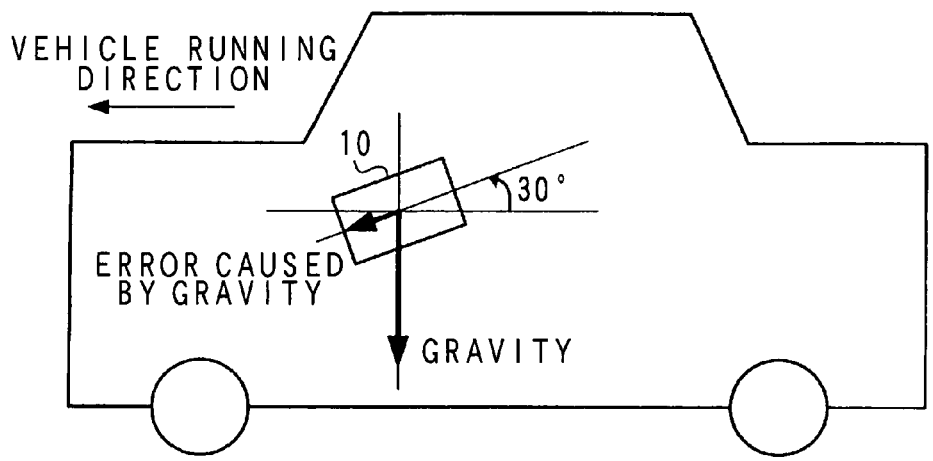
FIGS. 3A and 3B are explanatory views for explaining measurement error generated in the acceleration sensor 18c.

FIG. 3A shows an explanation chart for explaining measurement errors of the acceleration sensor 18c, when the navigation apparatus 10 is mounted in the vehicle in the inclined condition. FIG. 3A shows a case, in which a side of the navigation apparatus 10 (which is also referred to as an operation side) opposing to the user (the vehicle driver) is inclined upwardly by 30° from the horizontal direction. The acceleration sensor 18c of the navigation apparatus 10 detects the acceleration applied to the vehicle in the horizontal direction. Accordingly, errors may occur due to gravity in the acceleration detected by the acceleration sensor 18c, when the navigation apparatus 10 is inclined.

The navigation apparatus 10 generates correction data based on the inclination of the navigation apparatus 10 itself, in order to correct the measurement errors in the detected acceleration. The navigation apparatus 10 carries out a correction process to the detected data "a1" (m/s ^2) and "a2" (m/s ^2) for the vehicle acceleration by use of the correction data. As explained already, the corrected values for the detected data "a1" (m/s ^2) and "a2" (m/s ^2) become as the corrected values "A1" (m/s ^2) and "A2" (m/s ^2). Whenever the navigation apparatus 10 is mounted in the vehicle, an inclination correction process is carried out to produce the above correction data.

Even in the case that the navigation apparatus 10 is mounted in the vehicle in the horizontal condition, errors may appear in the detected data of the acceleration detected by the acceleration sensor 18c, due to the gravity when the vehicle runs on a sloping road.

Figure 3B:
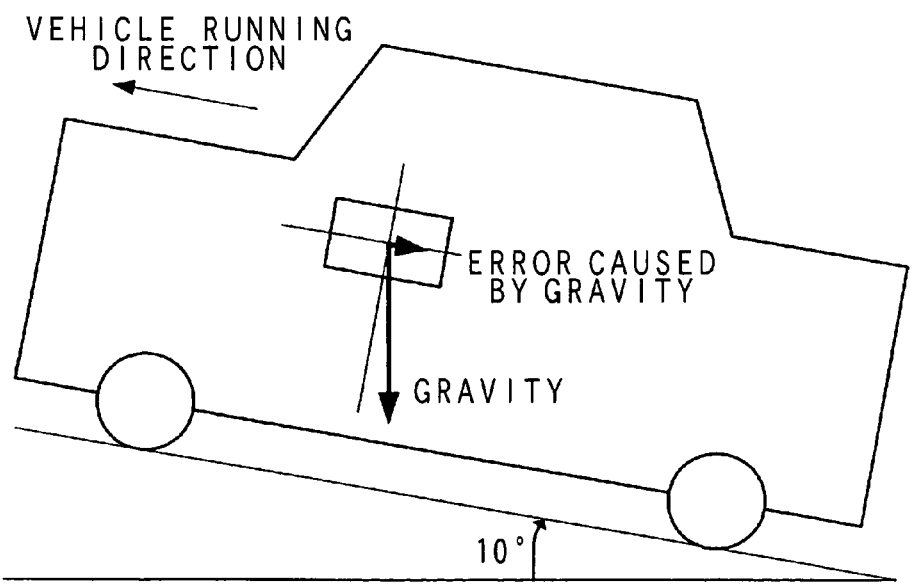

FIG. 3B shows an explanation chart for explaining measurement errors of the acceleration sensor 18c, when the vehicle runs on the sloping road. FIG. 3B shows a case in which the vehicle runs upwardly on the sloping road having an inclination of 10°. In this situation, the navigation apparatus 10 (the operation side) is inclined downwardly by 10° with respect to the horizontal direction. Accordingly, errors may likewise occur due to the gravity in the acceleration detected by the acceleration sensor 18c, because the navigation apparatus 10 is inclined.

(Explanation of Operation)

An operation of the navigation apparatus 10 of the first embodiment will be explained.

(4) A First Diagnosing Process for Vehicle Behavior

As already explained, the navigation apparatus 10 performs determinations for the vehicle behavior, such as a determination whether the steering operation has been smoothly carried out during vehicle travel, the determination whether the driver drove the vehicle safely on the curved road, the determination whether the sudden acceleration and/or the sudden braking operation was not done, and so on. The determinations are carried out based on the vehicle acceleration detected by the acceleration sensor 18c of the position detecting device 18 of the navigation apparatus 10.

At first, the navigation apparatus 10 determines accuracy of vehicle acceleration detected by the acceleration sensor 18c. The navigation apparatus 10 performs a first diagnosing process for the vehicle behavior, when the accuracy of the vehicle acceleration detected by the acceleration sensor 18c is in a good condition. Such diagnosing process will be explained with reference to a flow-chart of FIG. 4, which is carried out when the vehicle drive is started.

At a step S105, the control portion 17 of the navigation apparatus 10 determines whether the inclination correction process has been finished or not, wherein the inclination correction process is carried out whenever the navigation apparatus 10 is mounted in the vehicle. According to the inclination correction process, the correction data is made for correcting the measurement errors of the acceleration sensor 18c caused by the gravity, when the navigation apparatus 10 is mounted in the vehicle in the inclined condition. When the inclination correction process has been finished (Yes at the step S105), the process carried out by the control portion 17 goes to a step S110. When the inclination correction process has not been finished (No at the step S105), the process goes back to the step S105. In other words, the step S105 will be repeated until the inclination correction process will be completed.

At the step S110, the control portion 17 determines whether any situation for diagnosing the vehicle behavior has occurred or not. For example, those are the situations for diagnosing the vehicle behavior, when the vehicle has turned to the right or the left at road crossing points, when the vehicle has gone to a highway from a local street, when the sudden acceleration or sudden braking operation has been carried out, and soon. Since the control portion 17 defines a current position of the vehicle based on the map data inputted from the input device 14 and the position detecting device 18, the control portion 17 may determine that the situation for diagnosing the vehicle behavior has occurred when the vehicle runs through an area adjacent to the road crossing point or an approaching point to the highway. In addition, since the control portion 17 obtains vehicle operating information via the communication portion 19 for the in-vehicle LAN, the control portion 17 may determine whether the sudden accelerating operation or any other operation has been carried out, namely whether the situation for diagnosing the vehicle behavior has occurred or not, based on the vehicle operating information. In the case the situation for diagnosing the vehicle behavior has occurred (Yes at the step S110), the process of the control portion 17 goes to a step S111. When the situation for diagnosing the vehicle behavior has not occurred (No at the step S110), the process of the control portion 17 goes back to the step S110.

At the step S111, the control portion 17 defines (calculates) the vehicle acceleration "FB1" (m/s $^2$) in the longitudinal direction and the vehicle acceleration "LR1" (m/s $^2$) in the transverse direction, based on the detected data for the vehicle acceleration detected by the acceleration sensor 18c.

The vehicle acceleration "FB1" and "LR1" are collectively referred to as first vehicle acceleration. In addition, at a step S112, the control portion 17 defines (calculates) the vehicle acceleration in the longitudinal direction, based on records of the vehicle speed detected by the speed-pulse detecting device 16. The vehicle acceleration in the longitudinal direction, which is calculated based on the records of the actual vehicle speed, is also referred to as "FB2" (m/s $^2$).

The control portion 17 further defines (calculates), at the step S112, vehicle acceleration in the transverse direction, based on the current vehicle speed detected by the speed-pulse detecting device 16 and the vehicle angular speed detected by the gyroscope 18b, as in the following manner. The vehicle acceleration in the transverse direction, which is calculated based on the actual vehicle speed and angular speed, is also referred to as "LR2" (m/s $^2$). The vehicle acceleration "FB2" and "LR2" are collectively referred to as second vehicle acceleration.

"LR2"(m/s$^2$)=the angular speed(deg/s)×($\pi$/180)×the vehicle speed(km/h)×1000/3600

Then, at a step S115, the control portion 17 calculates a difference between "FB1" (m/s $^2$) and "FB2" (m/s $^2$) and a difference between "LR1" (m/s $^2$) and "LR2" (m/s $^2$). In the case that both of the differences are less than "1" (m/s $^2$), the control portion 17 determines that the accuracy for the detected data for the vehicle acceleration is in a good condition, and the process goes to a step S120. On the other hand, when either one of the differences is larger than "1" (m/s $^2$), the control portion 17 determines that the accuracy for the detected data for the vehicle acceleration is not in the good condition, and the process goes to a step S125.

At the step S120, the control portion 17 carries out the diagnosing process for the vehicle behavior. More specifically, the control portion 17 carries out the determinations, such as the determination whether the steering operation has been smoothly carried out during vehicle travel, the determination whether the driver drove the vehicle safely on the curved road, the determination whether the sudden accelerating and/or the sudden braking operation was not done, and so on, based on the vehicle acceleration in the longitudinal direction and the vehicle acceleration in the transverse direction, which are calculated based on the detected data for the vehicle acceleration detected by the acceleration sensor 18c. The control portion 17 carries out the diagnosis based on such determinations. Then, the process goes to the step S125.

At the step S125, the control portion 17 determines whether the vehicle operation is stopped. When the vehicle operation is stopped (Yes at the step S125), the process of the control portion 17 is terminated. When the vehicle operation is not yet stopped (No at the step S125), the process goes back to the step S110.

(5) Modifications of the First Diagnosing Process for Vehicle Behavior

The control portion 17 of the navigation apparatus 10 determines at the step S115 about the accuracy of the detected data of the vehicle acceleration detected by the acceleration sensor 18c, based on the first vehicle acceleration calculated from the detected data of the acceleration sensor 18c and the second vehicle acceleration calculated from the vehicle speed. The control portion 17 may determine the accuracy of the detected data of the acceleration sensor 18c in the following manners.

(5a) For example, the control portion 17 may determine about the accuracy of the detected data of the acceleration sensor 18c, based on rate of change of the vehicle acceleration detected by the acceleration sensor 18c.

Figure 5:
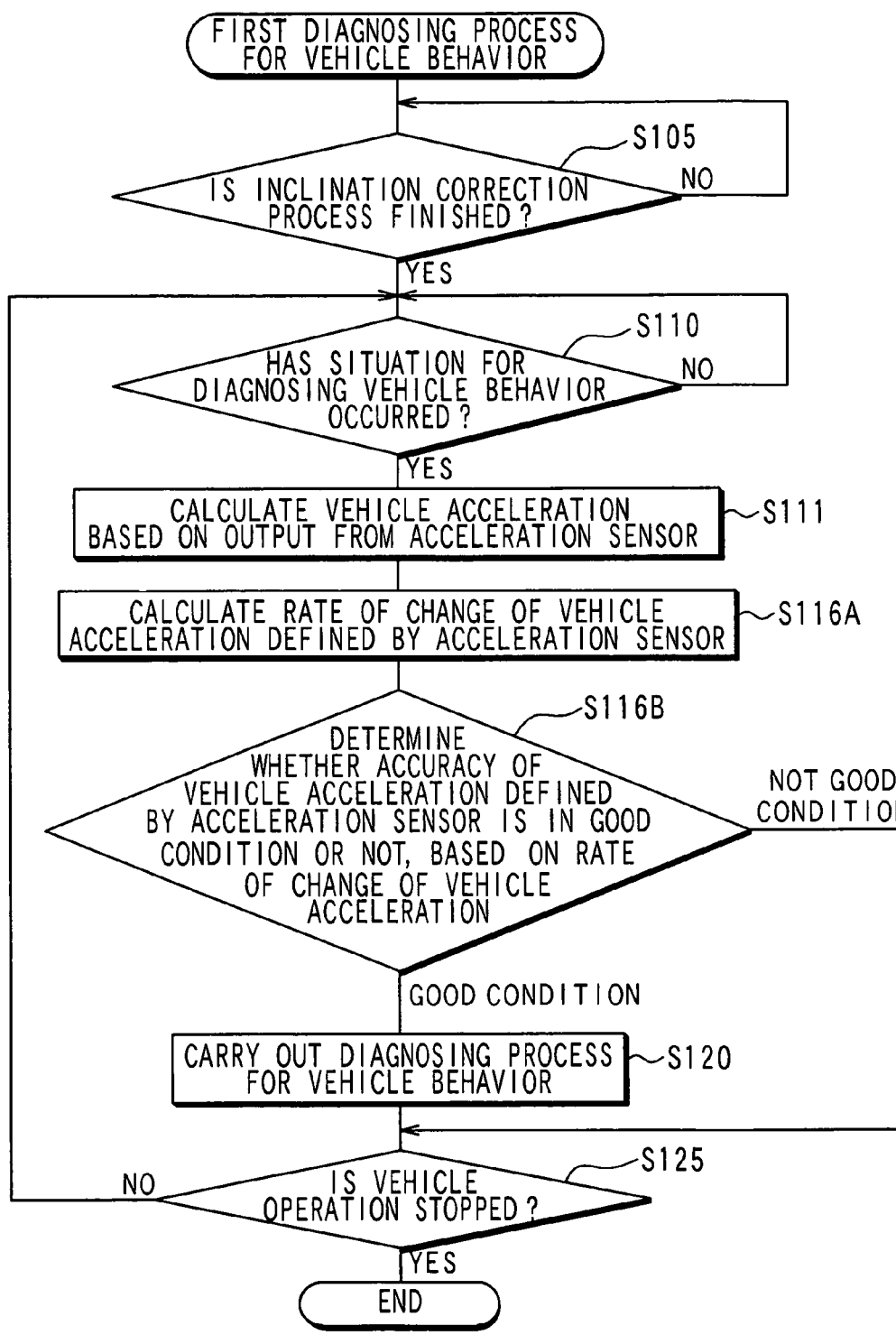
FIGS. 5 to 7 are flow-charts showing modifications of the first diagnosing process.

More specifically, as shown in FIG. 5 (at the step S111), the control portion 17 periodically calculates the vehicle acceleration detected by the acceleration sensor 18c. At a step S116A, the control portion 17 calculates the rate of change of the vehicle acceleration. Then, at a step S116B, the control portion 17 determines that the accuracy of the vehicle acceleration detected by the acceleration sensor 18c is not in the good condition, when the rate of change of the acceleration detected by the acceleration sensor 18c exceeds a predetermined value, or when the acceleration detected by the acceleration sensor 18c is repeating its increase and decrease at a predetermined value of the rate of change. The control portion 17 determines that the accuracy of the detected data of the acceleration sensor 18c is in the good condition, in the other cases than the above cases.

(5b) In addition, the control portion 17 may further determine about the accuracy of the detected data of the acceleration sensor 18c, based on a slope of the road on which the vehicle runs.

Figure 6:
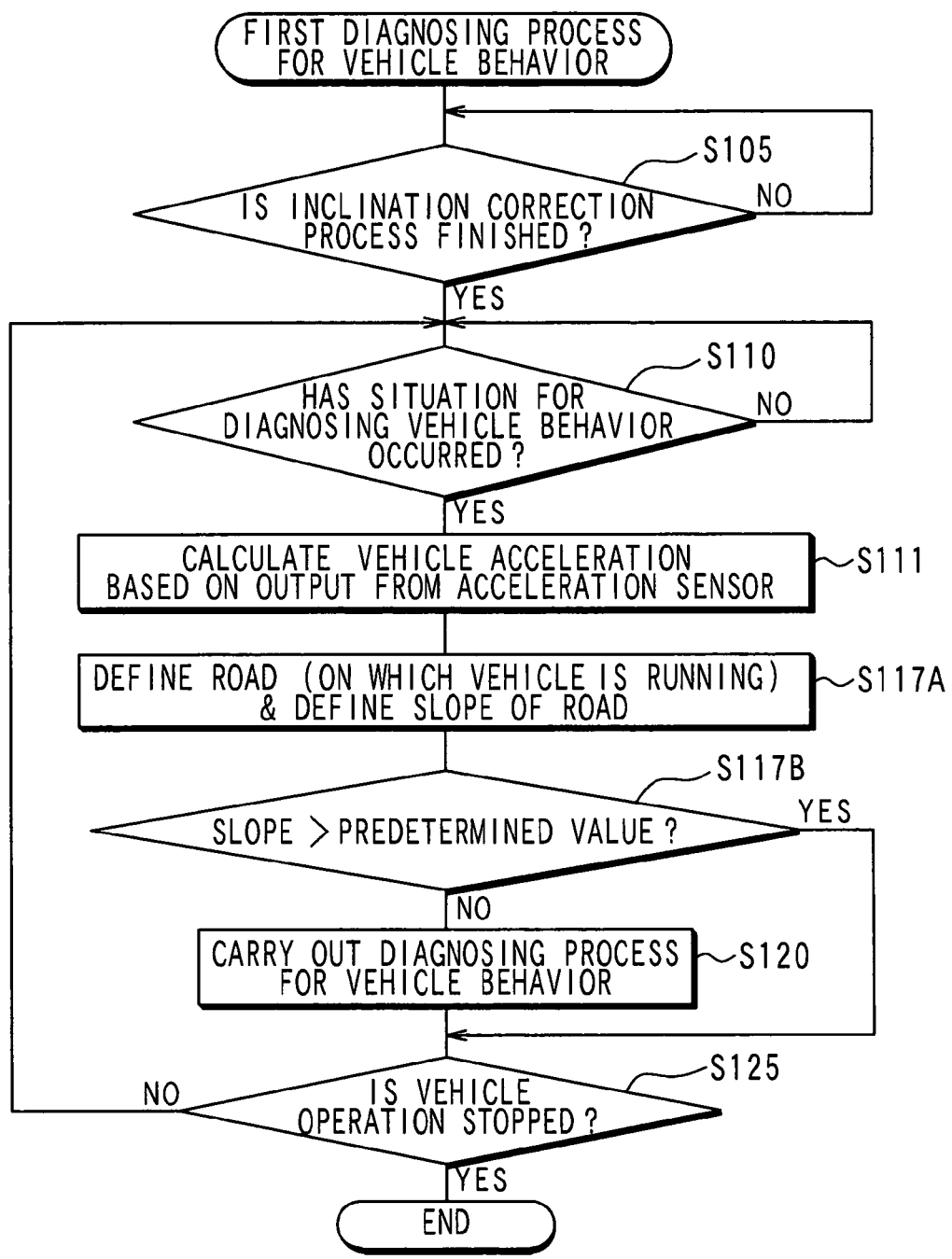

More specifically, as shown in FIG. 6 (at a step S117A), the control portion 17 defines a current road, on which the vehicle is running, based on the map data inputted from the input device 14 and the position detecting device 18, and the control portion 17 defines the slope of the road based on the map data.

Furthermore, at the step S117A, the control portion 17 defines the slope of the road, based on the information obtained via the external communication device 15.

Then, at a step S117B, the control portion 17 determines that the accuracy of the detected data of the acceleration sensor 18c is not in the good condition, when the slope of the road on which the vehicle is currently running is larger than a predetermined value. And the control portion 17 determines that the accuracy of the detected data of the acceleration sensor 18c is in the good condition, in the other cases than the above case.

(5c) In addition, the control portion 17 may further determine about the accuracy of the detected data of the acceleration sensor 18c, based on a condition of the road on which the vehicle is currently running.

Figure 7:
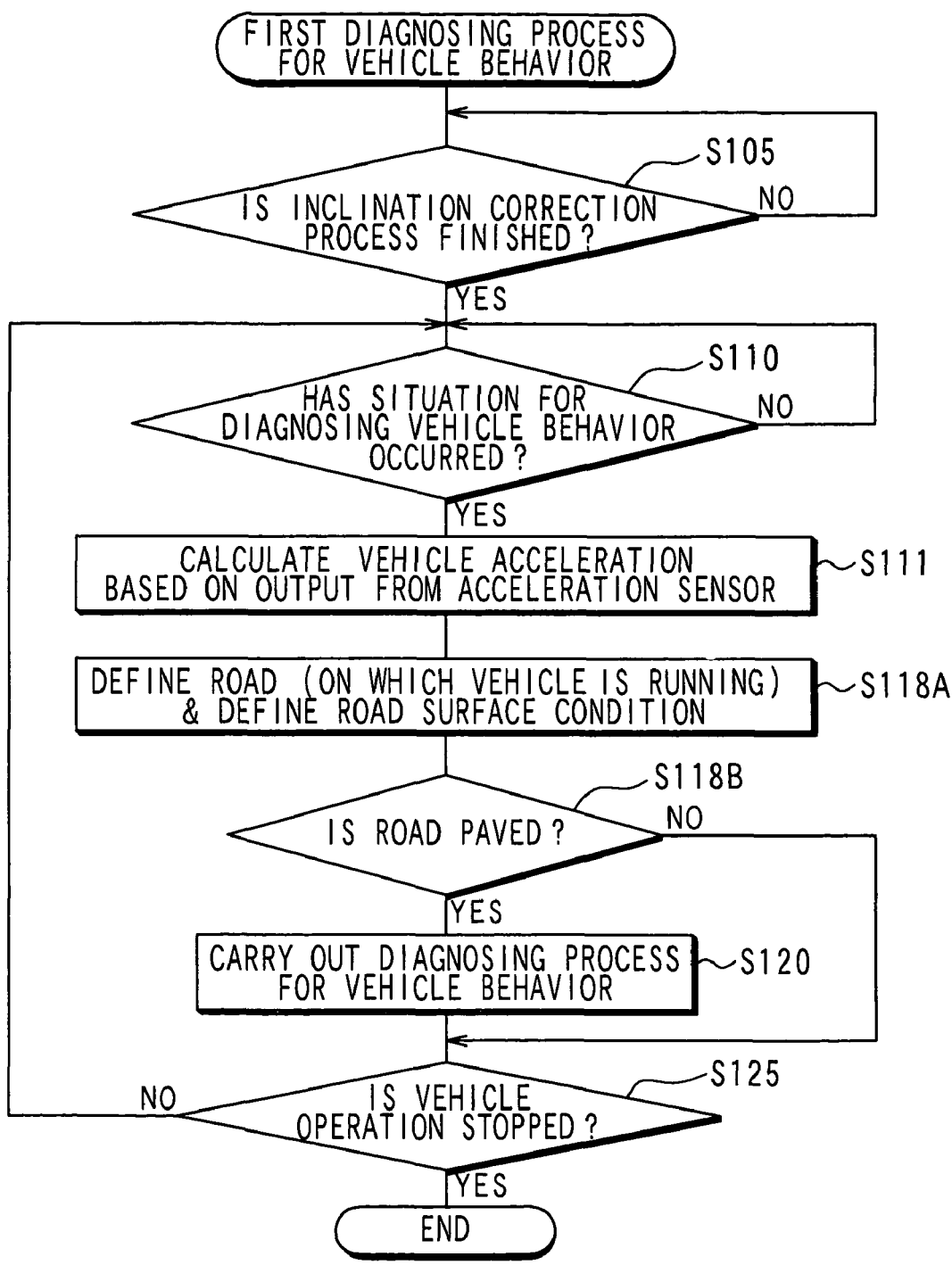

More specifically, as shown in FIG. 7 (at a step S118A), the control portion 17 defines a current road, on which the vehicle is running, based on the map data inputted from the input device 14 and the position detecting device 18, and the control portion 17 obtains information for the road based on the map data. Furthermore, at the step S118A, the control portion 17 defines a road surface condition of the road, based on the information obtained from the map data. Alternatively, the control portion 17 may define the information related to the road on which the vehicle is currently running, based on information obtained via the external communication device 15, image data obtained from a camera (not shown) via the communication portion 19 for the in-vehicle LAN.

Then, at a step S118B, the control portion 17 determines that the accuracy of the detected data of the acceleration sensor 18c is not in the good condition, when the control portion 17 determines based on the information related to the road that the road is not paved. Ana the control portion 17 determines that the accuracy of the detected data of the acceleration sensor 18c is in the good condition, in the other cases than the above case.

(6) Effects of First Embodiment (6a) According to the navigation apparatus 10 of the first embodiment, the control portion 17 carries out the diagnosing process, in which the vehicle behavior is diagnosed based on the vehicle acceleration detected by the acceleration sensor 18c. According to the navigation apparatus 10, the difference value is calculated between the first vehicle acceleration obtained from the detected data of the acceleration sensor 18c and the second vehicle acceleration obtained from the vehicle speed and angular speed, and the control portion 17 determines (at the step S115 of FIG. 4) about the accuracy of the first vehicle acceleration defined by the detected data of the acceleration sensor 18c based on the difference value. The diagnosing process (S120) is carried out, only when the control portion 17 determines that the accuracy of the detected data of the acceleration sensor 18c is in the good condition. Accordingly, the navigation apparatus 10 avoids that the diagnosing process (S120) is carried out when the accuracy of the detected data of the acceleration sensor 18c is not in the good condition. In other words, the navigation apparatus 10 prevents the diagnosing process (S120) from being carried out based on the detected data of the acceleration sensor 18c, the accuracy of which is not in the good condition.

(6b) According to the navigation apparatus 10, the diagnosing process (S120) for the vehicle behavior is not carried out, unless the inclination correction process is finished (at the step S105). As already explained, the inclination correction process is the process, according to which the correction data is made for correcting the measurement errors of the acceleration sensor 18c caused by the inclined position of the navigation apparatus 10.

Therefore, the navigation apparatus 10 avoids such a case, in which the detected data for the vehicle acceleration detected by the acceleration sensor 18c can not be corrected in order to remove the measurement errors and thereby the vehicle acceleration can not be accurately detected. In other words, the navigation apparatus 10 prevents the diagnosing process (S120) from being carried out based on the detected data of the acceleration sensor 18c, the accuracy of which is not in the good condition.

(6c) In the case that the vehicle runs on the punishing road, vibration in the vertical direction may occur in the vehicle, so that measurement errors may be generated in the vehicle acceleration detected by the acceleration sensor 18c. In particular, when the navigation apparatus 10 is mounted in the vehicle in the inclined condition, the measurement errors may be generated in the vehicle acceleration to be detected by the acceleration sensor 18c due to influence of the acceleration in the vertical direction.

As explained in the above paragraph (5a) for the modification of the first embodiment, the navigation apparatus 10 may determine the accuracy of the vehicle acceleration detected by the acceleration sensor 18c, based on the rate of change for the vehicle acceleration detected by the acceleration sensor 18c (at the step S116B of FIG. 5). According to such modification, the navigation apparatus 10 determines that the accuracy of the vehicle acceleration detected by the acceleration sensor is deteriorated when the vehicle acceleration detected by the acceleration sensor is rapidly changed. As a result, the diagnosing process (S120) for the vehicle behavior is avoided. The navigation apparatus 10 prevents, therefore, the diagnosing process (S120) from being carried out based on the detected data of the acceleration sensor 18c, the accuracy of which is not in the good condition.

(6d) In the case that the vehicle runs on the sloping road, the navigation apparatus 10 is brought into a condition in which the navigation apparatus 10 is inclined with respect to the horizontal line. As a result, the measurement errors may be generated in the vehicle acceleration to be detected by the acceleration sensor 18c due to influence of the gravity.

As explained in the above paragraph (5b) for the modification of the first embodiment, the navigation apparatus 10 may determine the accuracy of the vehicle acceleration detected by the acceleration sensor 18c, based on the slope of the road (at the step S117B of FIG. 6). According to such modification, the navigation apparatus 10 determines that the accuracy of the vehicle acceleration detected by the acceleration sensor is not in the good condition when the vehicle is running on the sloping road, the slope of which is larger than a predetermined value. As a result, the diagnosing process (S120) for the vehicle behavior is avoided. The navigation apparatus 10 likewise prevents the diagnosing process (S120) from being carried out based on the detected data of the acceleration sensor 18c, the accuracy of which is not in the good condition.

(6e) As already explained, when the vehicle runs on the punishing road, the vibration in the vertical direction may occur in the vehicle, so that measurement errors may be generated in the vehicle acceleration detected by the acceleration sensor 18c.

In such a case, as explained in the above paragraph (5c) for the modification of the first embodiment, the navigation apparatus 10 may determine the accuracy of the vehicle acceleration detected by the acceleration sensor 18c, based on the road surface information of the road on which vehicle is currently running (at the step S118B of FIG. 7).

According to such modification, the navigation apparatus 10 determines that the accuracy of the vehicle acceleration detected by the acceleration sensor is not in the good condition, for example, when the vehicle is running on the unpaved road. As a result, the diagnosing process (S120) for the vehicle behavior is avoided. Therefore, as in the same manner to the above cases, the navigation apparatus 10 prevents the diagnosing process (S120) from being carried out based on the detected data of the acceleration sensor 18c, the accuracy of which is not in the good condition.

Second Embodiment

Structure of the Second Embodiment

In a second embodiment, a navigation apparatus similar to that of the first embodiment is used. Therefore, explanations of the structures for the navigation apparatus 10 and the acceleration sensor 18c are omitted.

Explanation of Operation (7) A Second Diagnosing Process for Vehicle Behavior

As explained in the first embodiment, the navigation apparatus 10 performs determinations for the vehicle behavior, such as the determination whether the steering operation has been smoothly carried out during vehicle travel, the determination whether the driver drove the vehicle safely on the curved road, the determination whether the sudden acceleration and/or the sudden braking operation was not done, and so on. The determinations are carried out based on the vehicle acceleration.

Figure 8:
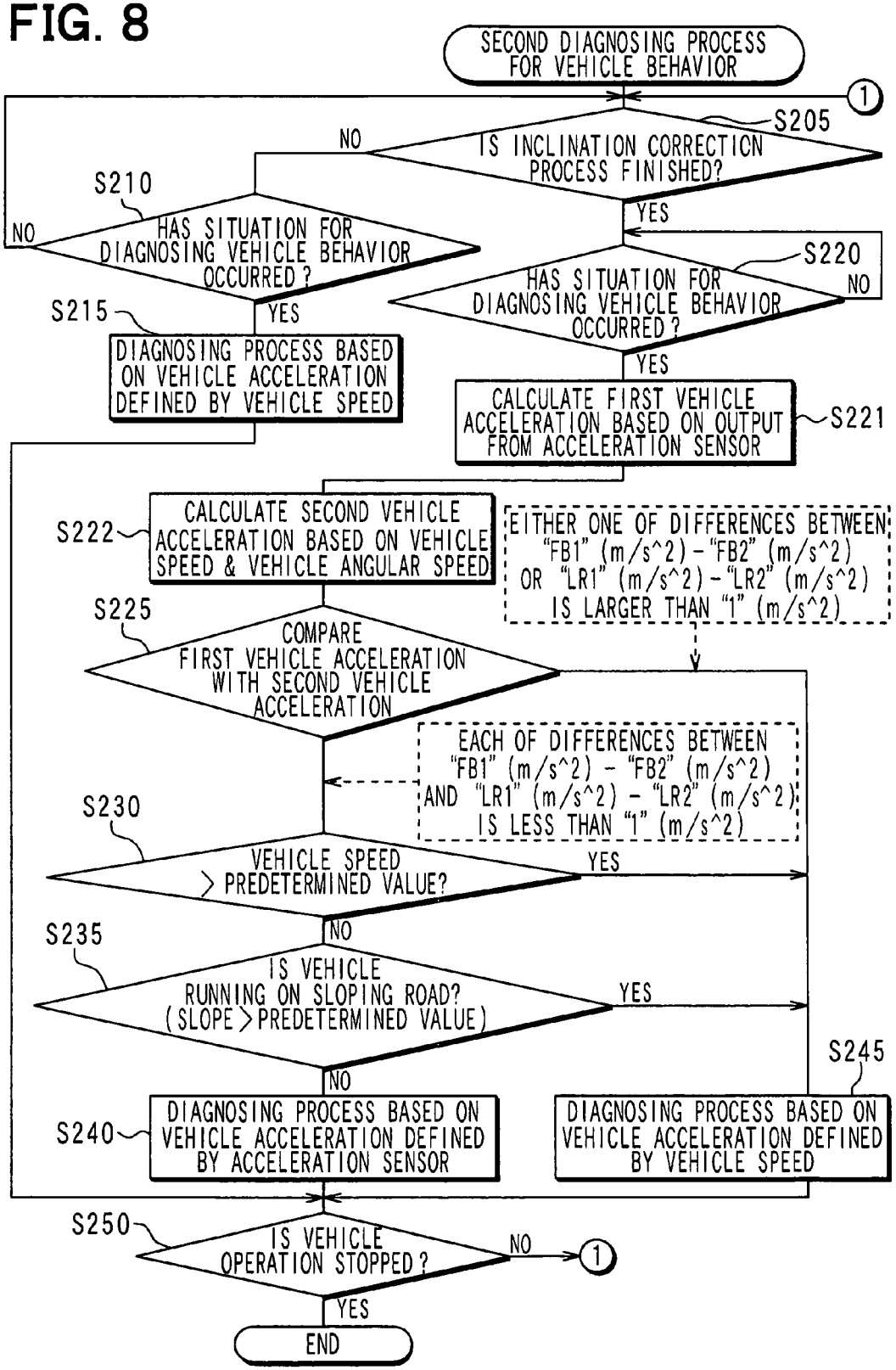
FIG. 8 is a flow-chart showing a second diagnosing process for vehicle behavior according to a second embodiment.

A second diagnosing process for the vehicle behavior will be explained with reference to a flow-chart of FIG. 8. The navigation apparatus 10 carries out the above determinations based on either the first vehicle acceleration detected by the acceleration sensor 18c or the second vehicle acceleration calculated based on the vehicle speed and the vehicle angular speed, and carries out the diagnosing process based on such determination. The diagnosing process is carried out when the vehicle operation is started.

At a step S205, the control portion 17 of the navigation apparatus 10 determines whether the inclination correction process has been finished or not. As already explained, the inclination correction process is carried out whenever the navigation apparatus 10 is mounted in the vehicle. According to the inclination correction process, the correction data is made for correcting the measurement errors of the acceleration sensor 18c caused by the gravity, when the navigation apparatus 10 is mounted in the vehicle in the inclined condition. When the inclination correction process has been finished (Yes at the step S205), the process of the control portion 17 goes to a step S220. When the inclination correction process has not been finished (No at the step S205), the process goes to a step S210.

At the step S210, the control portion 17 determines whether any situation for diagnosing the vehicle behavior has occurred or not, as in the same manner to the step S110 of FIG. 4. For example, those are the situations for diagnosing the vehicle behavior, when the vehicle has turned to the right or the left at the road crossing points, when the vehicle has gone to the highway from the local street, when the sudden acceleration or sudden braking operation has been carried out, and soon. Since the control portion 17 defines the current position of the vehicle based on the map data inputted from the input device 14 and the position detecting device 18, the control portion 17 may determine that the situation for diagnosing the vehicle behavior has occurred when the vehicle runs through the area adjacent to the road crossing point or the approaching point to the highway. In addition, since the control portion 17 obtains vehicle operating information via the communication portion 19 for the in-vehicle LAN, the control portion 17 may determine whether the sudden accelerating operation or any other operation has been carried out, namely whether the situation for diagnosing the vehicle behavior has occurred or not, based on the vehicle operating information. In the case the situation for diagnosing the vehicle behavior has occurred (Yes at the step S210), the process of the control portion 17 goes to a step S215. When the situation for diagnosing the vehicle behavior has not occurred (No at the step S210), the process of the control portion 17 goes back to the step S205.

At the step S215, the control portion 17 defines (calculates) the vehicle acceleration in the longitudinal direction ("FB2" (m/s $^{\wedge}$2)), based on records of the vehicle speed detected by the speed-pulse detecting device 16. In the same manner, the control portion 17 defines (calculates) vehicle acceleration in the transverse direction ("LR2" (m/s $^{\wedge}$2)), based on the current vehicle speed detected by the speed-pulse detecting device 16 and the vehicle angular speed detected by the gyroscope 18b, as in the following manner.

"LR2"(m/s$^{\wedge}$2)=the angular speed(deg/s)×(π/180)×the vehicle speed(km/h)×1000/3600

The control portion 17 carries out the diagnosing process (S215) for the vehicle behavior, based on the vehicle accelerations in the longitudinal direction and transverse direction of the vehicle, both of which are calculated based on the vehicle speed and vehicle angular speed.

More specifically, the control portion 17 carries out the determinations, such as the determination whether the steering operation has been smoothly carried out during vehicle travel, the determination whether the driver drove the vehicle safely on the curved road, the determination whether the sudden accelerating and/or the sudden braking operation was not done, and so on, based on the vehicle acceleration in the longitudinal direction and the vehicle acceleration in the transverse direction, both of which are calculated based on the vehicle speed. The control portion 17 carries out the diagnosis based on such determinations. Then, the process goes to a step S250.

At the step S220, to which the process moves on when the inclination correction process has been finished (Yes at the step S205), the control portion 17 determines whether any situation for diagnosing the vehicle behavior has occurred or not, as in the same manner to the step S210. When the situation for diagnosing the vehicle behavior has occurred (Yes at the step S220), the process goes to a step S221. When the situation for diagnosing the vehicle behavior has not yet occurred (No at the step S220), the process goes back to the step S220.

At steps S221 and S222, the control portion 17 carries out the processes as in the same manner to those of the steps S111 and S112 of FIG. 4. Namely, the control portion 17 defines (calculates) the vehicle acceleration "FB1" (m/s $^{\wedge}$2) in the longitudinal direction and the vehicle acceleration "LR1" (m/s $^{\wedge}$2) in the transverse direction, based on the detected data for the vehicle acceleration detected by the acceleration sensor 18c.

In addition, at the step S222, the control portion 17 defines (calculates) the vehicle acceleration "FB2" (m/s^2) in the longitudinal direction, based on records of the vehicle speed detected by the speed-pulse detecting device 16. At the step S222, the control portion 17 further defines (calculates) vehicle acceleration "LR2" (m/s^2) in the transverse direction, based on the current vehicle speed detected by the speed-pulse detecting device 16 and the vehicle angular speed detected by the gyroscope 18b, as in the following manner.

"LR2"(m/s^2)=the angular speed(deg/s)×(π/180)×the vehicle speed(km/h)×1000/3600

Then, at a step S225, the control portion 17 calculates the difference between "FB1" (m/s^2) and "FB2" (m/s^2) and the difference between "LR1" (m/s^2) and "LR2" (m/s^2). In the case that both of the differences are less than "1" (m/s^2), the control portion 17 determines that the accuracy for the detected data for the vehicle acceleration is in the good condition, and the process goes to a step S230. On the other hand, when either one of the differences is larger than "1" (m/s^2), the control portion 17 determines that the accuracy for the detected data for the vehicle acceleration is not in the good condition, and the process goes to a step S245.

At the step S230, the control portion 17 determines whether the vehicle speed detected by the speed-pulse detecting device 16 is larger than a predetermined speed. When the vehicle speed is higher than the predetermined value (Yes at the step S230), the control portion 17 determines that it is possible to define the vehicle acceleration based on the vehicle speed and the vehicle angular speed at a frequency necessary for carrying out the diagnosing process. Then, the process goes to the step S245. On the other hand, when the vehicle speed is lower than the predetermined value (No at the step S230), the process goes to a step S235.

At the step S235, the control portion 17 determines whether the vehicle is running on the sloping road, the slope of which is larger than a predetermined value.

More specifically, the control portion 17 may define the current road, on which the vehicle is running, based on the map data inputted from the input device 14 and the position detecting device 18, and the control portion 17 may define the slope of the road based on the map data. Furthermore, the control portion 17 may define the slope of the road, based on the information obtained via the external communication device 15.

The control portion 17 determines that the accuracy of the detected data of the acceleration sensor 18c is not in the good condition, when the slope of the road on which the vehicle is currently running is larger than the predetermined value (Yes at the step S235). Then, the process goes to the step S245. On the other hand, when the slope of the road is smaller than the predetermined value (No at the step S235), the control portion 17 determines that the accuracy of the detected data of the acceleration sensor 18c is in the good condition, and the process goes to a step S240.

At the step S240, the control portion 17 carries out the above explained diagnosing process for the vehicle behavior, based on the vehicle acceleration in the longitudinal direction and the vehicle acceleration in the transverse direction, which are defined by the detected data for the vehicle acceleration detected by the acceleration sensor 18c. When the diagnosing process (S240) is ended, the process goes to the step S250.

As explained above, when the accuracy of the detected data of the acceleration sensor 18c is not in the good condition, or when it is possible to define the vehicle acceleration based on the vehicle speed and the vehicle angular speed at the frequency necessary for carrying out the diagnosing process, the process moves on to the step S245. At the step S245, the control portion 17 carries out the above explained diagnosing process for the vehicle behavior, based on the vehicle acceleration in the longitudinal direction as well as the vehicle acceleration in the transverse direction, which are defined by the vehicle speed detected by the speed-pulse detecting device 16 and the vehicle angular speed detected by the gyroscope 18b. When the diagnosing process (S245) is ended, the process goes to the step S250.

At the step S250, the control portion 17 determines whether the vehicle operation is stopped. When the vehicle operation is stopped (Yes at the step S250), the process of the control portion 17 is terminated. When the vehicle operation is not yet stopped (No at the step S250), the process goes back to the step S205.

(8) Modifications of the Second Diagnosing Process for Vehicle Behavior

The control portion 17 determines at the step S235 about the accuracy of the detected data of the vehicle acceleration detected by the acceleration sensor 18c, based on the slope of the road on which the vehicle is running. The control portion 17 may alternatively determine the accuracy of the detected data of the acceleration sensor 18c in the following manners.

(8a) For example, as in the same manner to the modification explained in the paragraph (5a), the control portion 17 may determine about the accuracy of the detected data of the acceleration sensor 18c, based on rate of change of the vehicle acceleration detected by the acceleration sensor 18c.

Figure 9:
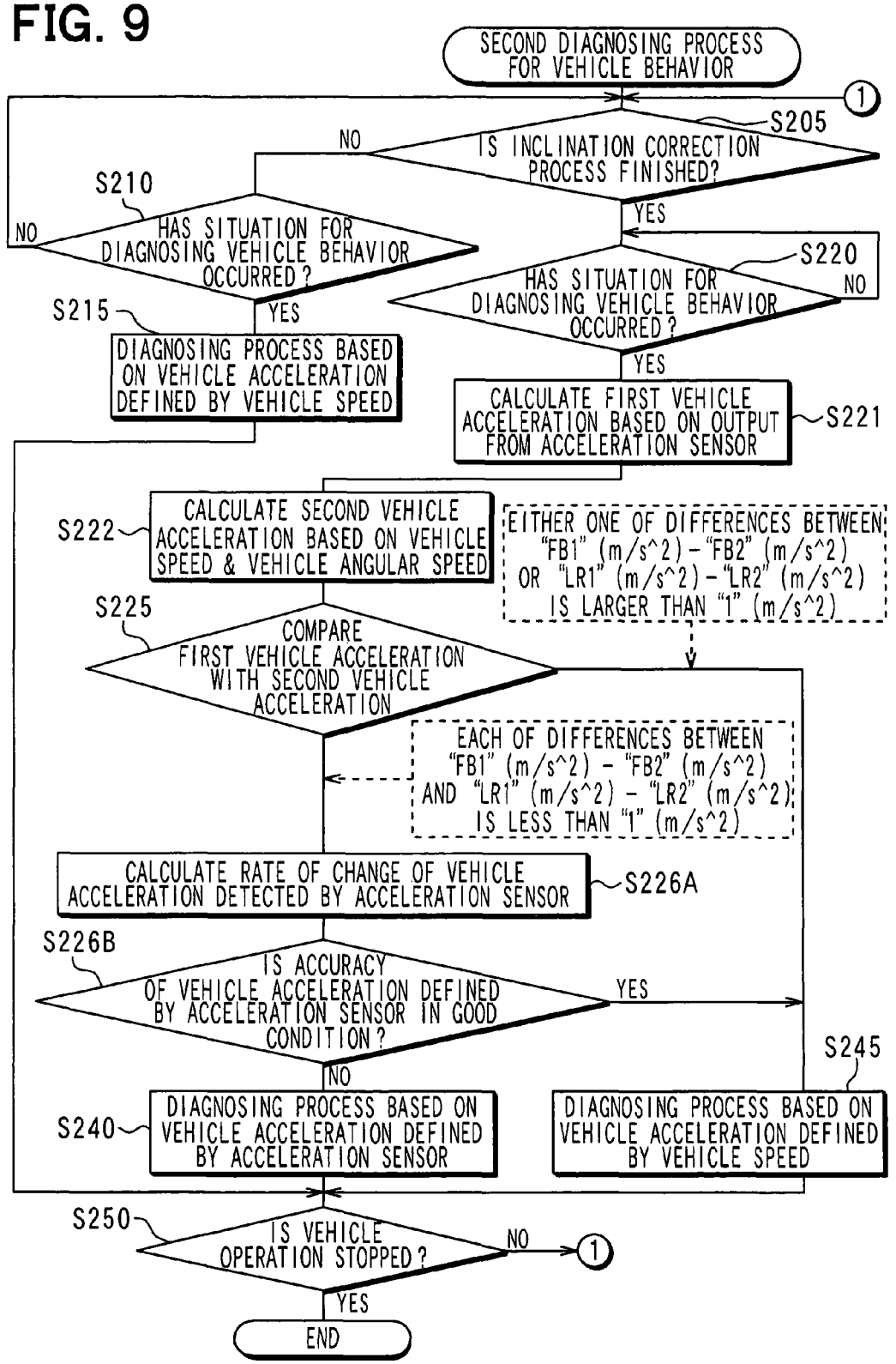
FIGS. 9 and 10 are flow-charts showing modifications of the second diagnosing process.

More specifically, as shown in FIG. 9 (at the step S221), the control portion 17 periodically calculates the vehicle acceleration detected by the acceleration sensor 18c. At the step S222, the control portion 17 likewise calculates the vehicle acceleration based on the vehicle speed and vehicle angular speed. And at a step S226A (after the step S225), the control portion calculates the rate of change of the vehicle acceleration defined by the acceleration sensor 18c. Then, at a step S226B, the control portion determines that the accuracy of the vehicle acceleration detected by the acceleration sensor 18c is not in the good condition, when the rate of change of the acceleration detected by the acceleration sensor 18c exceeds a predetermined value, or when the acceleration detected by the acceleration sensor 18c is repeating its increase and decrease at a predetermined value for the rate of change. The control portion 17 determines that the accuracy of the detected data of the acceleration sensor 18c is in the good condition, in the other cases than the above cases.

(8b) In addition, as in the same manner to the modification explained in the paragraph (5c), the control portion 17 may further determine about the accuracy of the detected data of the acceleration sensor 18c, based on a condition of the road on which the vehicle is currently running.

Figure 10:
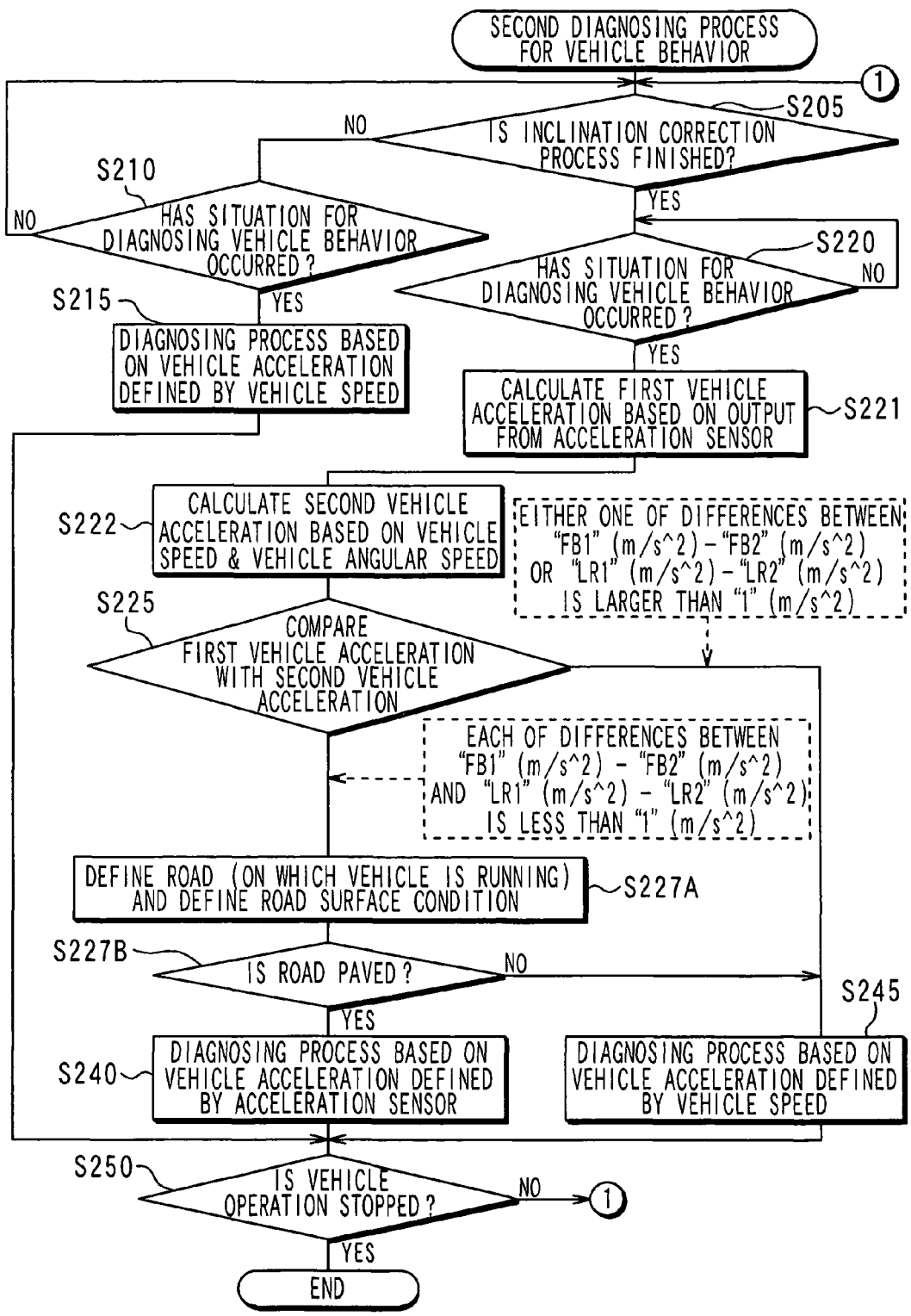

More specifically, as shown in FIG. 10 (at a step S227A), the control portion 17 defines a current road, on which the vehicle is running, based on the map data inputted from the input device 14 and the position detecting device 18, and the control portion 17 obtains information for the road based on the map data. Furthermore, at the step S227A, the control portion 17 defines a road surface condition of the road, based on the information obtained from the map data. Alternatively, the control portion 17 may define the information related to the road on which the vehicle is currently running, based on information obtained via the external communication device 15, image data obtained from a camera (not shown) via the communication portion 19 for the in-vehicle LAN.

Then, at a step S227B, the control portion 17 determines that the accuracy of the detected data of the acceleration sensor 18c is not in the good condition, when the control portion 17 determines based on the information related to the road that the road is not paved. And the control portion 17 determines that the accuracy of the detected data of the acceleration sensor 18c is in the good condition, in the other cases than the above case.

(9) Effects of Second Embodiment (9a) According to the navigation apparatus 10 of the second embodiment, the control portion 17 carries out the diagnosing process (S240) so that the vehicle behavior is diagnosed based on the vehicle acceleration detected by the acceleration sensor 18c, when the accuracy of the detected data of the acceleration sensor 18c is in the good condition. Accordingly, the navigation apparatus 10 can accurately carry out the diagnosing process (S240) for the vehicle behavior.

Furthermore, the navigation apparatus 10 carries out the diagnosing process (S215, S245) for the vehicle behavior based on the vehicle acceleration defined by the vehicle speed and the vehicle angular speed, when the accuracy of the detected data of the acceleration sensor 18c is not in the good condition. In case of defining the vehicle acceleration based on the vehicle speed and so on, it takes a longer time than a case in which the vehicle acceleration is defined by the detected data of the acceleration sensor 18c. Therefore, it should be taken into consideration that the accuracy for the diagnosing process (S215, S245) may become worse when the diagnosing process is carried out based on the vehicle acceleration defined by the vehicle speed and so on, in comparison with the case in which the diagnosing process (S240) is carried out based on the vehicle acceleration defined by the detected data of the acceleration sensor 18c.

More specifically, the navigation apparatus 10 determines the accuracy of the vehicle acceleration defined by the detected data of the acceleration sensor 18c (S225), based on the difference between the vehicle acceleration defined by the detected data of the acceleration sensor 18c and the vehicle acceleration defined by the vehicle speed and the vehicle angular speed. The navigation apparatus 10 carries out the diagnosing process (S245) based on the vehicle acceleration defined by the vehicle speed and the vehicle angular speed, when the accuracy of the vehicle acceleration defined by the detected data of the acceleration sensor 18c is not in the good condition. As a result, the navigation apparatus 10 can carry out the diagnosing process (S245) without largely affecting the accuracy of the diagnosing process, even in the case that the accuracy of the vehicle acceleration defined by the detected data of the acceleration sensor 18c is not in the good condition.

(9b) In addition, the navigation apparatus 10 determines that the accuracy of the vehicle acceleration defined by the detected data of the acceleration sensor 18c is not in the good condition, when the vehicle is running on the sloping road, the slope of which is larger than the predetermined value (Yes at the step S235). Then, the navigation apparatus 10 carries out the diagnosing process (S245), based on the vehicle acceleration defined by the vehicle speed and the vehicle angular speed. As a result, the navigation apparatus 10 can likewise carry out the diagnosing process (S245) without largely affecting the accuracy of the diagnosing process, even in the case that the accuracy of the vehicle acceleration defined by the detected data of the acceleration sensor 18c is not in the good condition.

(9c) In addition, the navigation apparatus 10 determines that the accuracy of the vehicle acceleration defined by the detected data of the acceleration sensor 18c is not in the good condition, when the inclination correction process is not finished (No at the step S205). As already explained, the inclination correction process is the process, according to which the correction data is made for correcting the measurement errors of the acceleration sensor 18c caused by the inclined position of the navigation apparatus 10. Then, the navigation apparatus 10 carries out the diagnosing process for the vehicle behavior (S215), based on the vehicle acceleration defined by the vehicle speed and the vehicle angular speed. As a result, the navigation apparatus 10 can likewise carry out the diagnosing process (S215) without largely affecting the accuracy of the diagnosing process, even in the case that the navigation apparatus 10 can not accurately define the vehicle acceleration by the detected data of the acceleration sensor 18c.

(9d) In addition, the navigation apparatus 10 determines that it is possible to define the vehicle acceleration at the frequency necessary for carrying out the diagnosing process, based on the vehicle speed and the vehicle angular speed, when the vehicle speed is higher than the predetermined value (Yes at the step S230). Then, the navigation apparatus 10 carries out the diagnosing process (S245), based on the vehicle acceleration defined by the vehicle speed and the vehicle angular speed. As a result, the navigation apparatus 10 can likewise carry out the diagnosing process (S245), based on the vehicle acceleration defined by the vehicle speed and the vehicle angular speed, at an accuracy almost equal to that for the case in which the diagnosing process (S240) is carried out based on the vehicle acceleration defined by the detected data of the acceleration sensor 18c.

(9e) As already explained in connection with the first embodiment, in the case the vehicle runs on the punishing road, vibration in the vertical direction may occur in the vehicle, so that measurement errors may be generated in the vehicle acceleration detected by the acceleration sensor 18c. In particular, when the navigation apparatus 10 is mounted in the vehicle in the inclined condition, the measurement errors may be generated in the vehicle acceleration to be detected by the acceleration sensor 18c due to influence of the acceleration in the vertical direction.

As explained in the above paragraph (8a) for the modification of the second embodiment, the navigation apparatus 10 may determine the accuracy of the vehicle acceleration detected by the acceleration sensor 18c, based on the rate of change for the vehicle acceleration detected by the acceleration sensor 18c (at the step S226B of FIG. 9). According to such modification, the navigation apparatus 10 determines that the accuracy of the vehicle acceleration detected by the acceleration sensor is deteriorated when the vehicle acceleration detected by the acceleration sensor is rapidly changed. Then, the navigation apparatus 10 carries out the diagnosing process (S245) based on the vehicle acceleration defined by the vehicle speed and the vehicle angular speed. As a result, the navigation apparatus 10 can carry out the diagnosing process (S245) without largely affecting the accuracy of the diagnosing process, even in the case that the accuracy of the vehicle acceleration detected by the acceleration sensor 18c is deteriorated.

(9f) As already explained, when the vehicle runs on the punishing road, the vibration in the vertical direction may occur in the vehicle, so that measurement errors may be generated in the vehicle acceleration detected by the acceleration sensor 18c.

In such a case, as explained in the above paragraph (8b) for the modification of the second embodiment, the navigation apparatus 10 may determine the accuracy of the vehicle acceleration detected by the acceleration sensor 18c, based on the road surface information of the road on which vehicle is currently running.

According to such modification, the navigation apparatus 10 determines that the accuracy of the vehicle acceleration detected by the acceleration sensor is not in the good condition, for example, when the vehicle is running on the unpaved road (at the step S227B of FIG. 10). Then, the navigation apparatus 10 carries out the diagnosing process (S245) based on the vehicle acceleration defined by the vehicle speed and the vehicle angular speed. As a result, the navigation apparatus 10 can carry out the diagnosing process (S245) without largely affecting the accuracy of the diagnosing process, even in the case that the accuracy of the vehicle acceleration detected by the acceleration sensor 18c is deteriorated.

Other Embodiments

(10) The navigation apparatus 10 of the first and second embodiments defines the vehicle speed based on the speed pulses detected by the speed-pulse detecting device 16. However, the navigation apparatus 10 may define the vehicle speed based on records of the current position defined by the GPS receiver 18a. According to such a modified embodiment, the navigation apparatus 10 can define the vehicle acceleration based on the vehicle speed.

(11) The navigation apparatus 10 of the first and second embodiments determines the accuracy of the vehicle acceleration calculated by the acceleration sensor 18c, to carry out the diagnosing process based on the vehicle acceleration calculated by the acceleration sensor 18c or the vehicle acceleration defined by the vehicle speed and the vehicle angular speed. Needless to say, the navigation apparatus 10 may carry out any other processes than the diagnosing process, based on the vehicle acceleration. Even according to such modified structure, the navigation apparatus 10 can avoid the case, in which the other processes will be carried out based on the vehicle acceleration, the accuracy of which is not in the good condition.

What is claimed is:

1. An in-vehicle apparatus, which carries out a vehicle control process based on vehicle acceleration in a horizontal direction, comprising:
   a first acceleration defining portion for defining a first vehicle acceleration in a horizontal direction based on an output from an acceleration sensor mounted in a vehicle;
   a vehicle speed defining portion for defining a first vehicle speed;
   a vehicle angular speed defining portion for defining a vehicle angular speed;
   a second acceleration defining portion for defining a second vehicle acceleration in a horizontal direction based on the vehicle speed defined by vehicle speed defining portion and the vehicle angular speed defined by the vehicle angular speed defining portion;
   a determining portion for determining whether the first acceleration defining portion is in a condition for accurately defining the first vehicle acceleration in the horizontal direction by use of the output from the acceleration sensor, based on the first vehicle acceleration defined by the first acceleration defining portion and the second vehicle acceleration defined by the second acceleration defining portion; and
   a control portion for carrying out the vehicle control process based on the first vehicle acceleration in the horizontal direction, which is defined by the output from the acceleration sensor,
   wherein the control portion carries out the vehicle control process based on not the first vehicle acceleration in the horizontal direction but the second vehicle acceleration in the horizontal direction, when a predetermined vehicle operating condition for the first and second vehicle accelerations is satisfied, wherein
   the control portion determines that the predetermined vehicle operating condition for the first and second vehicle accelerations is satisfied, when the first acceleration defining portion is not in a condition for accurately defining the first vehicle acceleration in the horizontal direction based on the output from the acceleration sensor, and
   the control portion carries out the vehicle control process based on not the first vehicle acceleration in the horizontal direction but the second vehicle acceleration in the horizontal direction.

2. An in-vehicle apparatus, which carries out a vehicle control process based on vehicle acceleration in a horizontal direction, comprising:
   an acceleration defining portion for defining a first vehicle acceleration in a horizontal direction based on an output from an acceleration sensor mounted in a vehicle;
   a determining portion for determining, whether the acceleration defining portion is in a condition for accurately defining the first vehicle acceleration in the horizontal direction based on the output from the acceleration sensor, based on a rate of change of the first vehicle acceleration in the horizontal direction defined by the output from the acceleration sensor; and
   a control portion for carrying out the vehicle control process based on the first vehicle acceleration in the horizontal direction, which is defined by the output from the acceleration sensor,
   wherein the control portion carries out the vehicle control process based on not the first vehicle acceleration in the horizontal direction but a second vehicle acceleration in the horizontal direction based on vehicle speed and vehicle angular speed, when a predetermined vehicle operating condition for the first and second vehicle accelerations is satisfied, wherein
   the control portion determines that the predetermined vehicle operating condition for the first and second vehicle accelerations is satisfied, when the acceleration defining portion is not in a condition for accurately defining the first vehicle acceleration in the horizontal direction based on the output from the acceleration sensor, and
   the control portion carries out the vehicle control process based on not the first vehicle acceleration in the horizontal direction but the second vehicle acceleration in the horizontal direction.

3. An in-vehicle apparatus, which carries out a vehicle control process based on vehicle acceleration in a horizontal direction, comprising:
   an acceleration defining portion for defining a first vehicle acceleration in a horizontal direction based on an output from an acceleration sensor mounted in a vehicle;
   a slope defining portion for defining a slope of a road on which the vehicle is running;
   a determining portion for determining, whether the acceleration defining portion is in a condition for accurately defining the vehicle acceleration in the horizontal direction based on the output from the acceleration sensor, based on the slope of the road defined by the slope defining portion; and a control portion for carrying out the vehicle control process based on the first vehicle acceleration in the horizontal direction, which is defined by the output from the acceleration sensor, wherein the control portion carries out the vehicle control process based on not the first vehicle acceleration in the horizontal direction but a second vehicle acceleration in the horizontal direction based on vehicle speed and vehicle angular speed, when a predetermined vehicle operating condition for the first and second vehicle accelerations is satisfied, wherein the control portion determines that the predetermined vehicle operating condition for the first and second vehicle accelerations is satisfied, when the acceleration defining portion is not in a condition for accurately defining the first vehicle acceleration in the horizontal direction based on the output from the acceleration sensor, and the control portion carries out the vehicle control process based on not the first vehicle acceleration in the horizontal direction but the second vehicle acceleration in the horizontal direction.

4. An in-vehicle apparatus, which carries out a vehicle control process based on vehicle acceleration in a horizontal direction, comprising:

an acceleration defining portion for defining a first vehicle acceleration in a horizontal direction based on an output from an acceleration sensor mounted in a vehicle;

a road-surface defining portion for defining a surface condition of a road on which the vehicle is running;

a determining portion for determining, whether the acceleration defining portion is in a condition for accurately defining the first vehicle acceleration in the horizontal direction based on the output from the acceleration sensor, based on the surface condition of the road defined by the road-surface defining portion; and a control portion for carrying out the vehicle control process based on the first vehicle acceleration in the horizontal direction, which is defined by the output from the acceleration sensor, wherein the control portion carries out the vehicle control process based on not the first vehicle acceleration in the horizontal direction but a second vehicle acceleration in the horizontal direction based on vehicle speed and vehicle angular speed, when a predetermined vehicle operating condition for the first and second vehicle accelerations is satisfied, wherein the control portion determines that the predetermined vehicle operating condition for the first and second vehicle accelerations is satisfied, when the acceleration defining portion is not in a condition for accurately defining the first vehicle acceleration in the horizontal direction based on the output from the acceleration sensor, and the control portion carries out the vehicle control process based on not the first vehicle acceleration in the horizontal direction but the second vehicle acceleration in the horizontal direction.

5. An in-vehicle apparatus, which carries out a vehicle control process based on vehicle acceleration in a horizontal direction, comprising:

an acceleration defining portion for defining a first vehicle acceleration in a horizontal direction based on an output from an acceleration sensor mounted in a vehicle;

a correction data calculating portion for preparing correction data to correct measurement errors included in the output from the acceleration sensor, wherein the measurement errors may be generated due to a situation in which the acceleration sensor is mounted in the vehicle in an inclined condition;

a determining portion for determining that the acceleration defining portion is not in a condition for accurately defining the vehicle acceleration in the horizontal direction based on the output from the first acceleration sensor, when the correction data is not prepared by the correction data calculating portion; and a control portion for carrying out the vehicle control process based on the first vehicle acceleration in the horizontal direction, which is defined by the output from the acceleration sensor, wherein the control portion carries out the vehicle control process based on not the first vehicle acceleration in the horizontal direction but a second vehicle acceleration in the horizontal direction based on vehicle speed and vehicle angular speed, when a predetermined vehicle operating condition for the first and second vehicle accelerations is satisfied, wherein the control portion determines that the predetermined vehicle operating condition for the first and second vehicle accelerations is satisfied, when the acceleration defining portion is not in a condition for accurately defining the first vehicle acceleration in the horizontal direction based on the output from the acceleration sensor, and the control portion carries out the vehicle control process based on not the first vehicle acceleration in the horizontal direction but the second vehicle acceleration in the horizontal direction.

6. An in-vehicle apparatus, which carries out a vehicle control process based on vehicle acceleration in a horizontal direction, comprising:

a first acceleration defining portion for defining a first vehicle acceleration in a horizontal direction based on an output from an acceleration sensor mounted in a vehicle;

a vehicle speed defining portion for defining a vehicle speed;

a vehicle angular speed defining portion for defining a vehicle angular speed;

a second acceleration defining portion for defining a second vehicle acceleration in a horizontal direction based on the vehicle speed defined by vehicle speed defining portion and the vehicle angular speed defined by the vehicle angular speed defining portion; and a control portion for carrying out the vehicle control process based on the first vehicle acceleration in the horizontal direction, which is defined by the output from the acceleration sensor, wherein the control portion carries out the vehicle control process based on not the first vehicle acceleration in the horizontal direction but the second vehicle acceleration in the horizontal direction, when a predetermined vehicle operating condition for the first and second vehicle accelerations is satisfied, wherein the control portion determines that the predetermined vehicle operating condition for the first and second vehicle accelerations is satisfied, when the first acceleration defining portion is not in a condition for accurately defining the first vehicle acceleration in the horizontal direction based on the output from the acceleration sensor, and the control portion carries out the vehicle control process based on not the first vehicle acceleration in the horizontal direction but the second vehicle acceleration in the horizontal direction.

7. The in-vehicle apparatus according to the claim 6, further comprising:
   a first determining portion for determining whether the first acceleration defining portion is in a condition for accurately defining the first vehicle acceleration in the horizontal direction by use of the output from the acceleration sensor, based on the first vehicle acceleration defined by the first acceleration defining portion and the second vehicle acceleration defined by the second acceleration defining portion, wherein
   the control portion determines that the predetermined vehicle operating condition for the first and second vehicle accelerations is satisfied, when the first determining portion determines that the first acceleration defining portion is not in the condition for accurately defining the first vehicle acceleration in the horizontal direction based on the output from the acceleration sensor, and
   the control portion carries out the vehicle control process based on not the first vehicle acceleration in the horizontal direction but the second vehicle acceleration in the horizontal direction.

8. The in-vehicle apparatus according to the claim 6, further comprising:
   a second determining portion for determining, whether the first acceleration defining portion is in a condition for accurately defining the first vehicle acceleration in the horizontal direction based on the output from the acceleration sensor, based on a rate of change of the first vehicle acceleration in the horizontal direction defined by the output from the acceleration sensor, wherein
   the control portion determines that the predetermined vehicle operating condition for the first and second vehicle accelerations is satisfied, when the second determining portion determines that the first acceleration defining portion is not in the condition for accurately defining the first vehicle acceleration in the horizontal direction based on the output from the acceleration sensor, and
   the control portion carries out the vehicle control process based on not the first vehicle acceleration in the horizontal direction but the second vehicle acceleration in the horizontal direction.

9. The in-vehicle apparatus according to the claim 6, further comprising:
   a slope defining portion for defining a slope of a road on which the vehicle is running; and
   a third determining portion for determining, whether the first acceleration defining portion is in a condition for accurately defining the first vehicle acceleration in the horizontal direction based on the output from the acceleration sensor, based on the slope of the road defined by the slope defining portion, wherein
   the control portion determines that the predetermined vehicle operating condition for the first and second vehicle accelerations is satisfied, when the third determining portion determines that the first acceleration defining portion is not in the condition for accurately defining the first vehicle acceleration in the horizontal direction based on the output from the acceleration sensor, and the control portion carries out the vehicle control process based on not the first vehicle acceleration in the horizontal direction but the second vehicle acceleration in the horizontal direction.

10. The in-vehicle apparatus according to the claim 6, further comprising:
    a road-surface defining portion for defining a surface condition of a road on which the vehicle is running; and
    a fourth determining portion for determining, whether the first acceleration defining portion is in a condition for accurately defining the first vehicle acceleration in the horizontal direction based on the output from the acceleration sensor, based on the surface condition of the road defined by the road-surface defining portion, wherein
    the control portion determines that the predetermined vehicle operating condition for the first and second vehicle accelerations is satisfied, when the fourth determining portion determines that the first acceleration defining portion is not in the condition for accurately defining the first vehicle acceleration in the horizontal direction based on the output from the acceleration sensor, and
    the control portion carries out the vehicle control process based on not the first vehicle acceleration in the horizontal direction but the second vehicle acceleration in the horizontal direction.

11. The in-vehicle apparatus according to the claim 6, further comprising:
    a correction data calculating portion for calculating correction data to correct measurement errors included in the output from the acceleration sensor, wherein the measurement errors may be generated due to a situation in which the acceleration sensor is mounted in the vehicle in an inclined condition; and
    a fifth determining portion for determining whether the first acceleration defining portion is in a condition for accurately defining the first vehicle acceleration in the horizontal direction based on the output from the acceleration sensor, wherein
    the control portion determines that the predetermined vehicle operating condition for the first and second vehicle accelerations is satisfied, when the fifth determining portion determines that the first acceleration defining portion is not in the condition for accurately defining the first vehicle acceleration in the horizontal direction based on the output from the acceleration sensor, and
    the control portion carries out the vehicle control process based on not the first vehicle acceleration in the horizontal direction but the second vehicle acceleration in the horizontal direction.

12. An in-vehicle apparatus, which carries out a vehicle control process based on vehicle acceleration in a horizontal direction, comprising:
    a first acceleration defining portion for defining a first vehicle acceleration in a horizontal direction based on an output from an acceleration sensor mounted in a vehicle;
    a vehicle speed defining portion for defining a vehicle speed;
    a vehicle angular speed defining portion for defining a vehicle angular speed;
    a second acceleration defining portion for defining a second vehicle acceleration in a horizontal direction based on the vehicle speed defined by vehicle speed defining portion and the vehicle angular speed defined by the vehicle angular speed defining portion; and a control portion for carrying out the vehicle control process based on the first vehicle acceleration in the horizontal direction, which is defined by the output from the acceleration sensor, wherein the control portion carries out the vehicle control process based on not the first vehicle acceleration in the horizontal direction but the second vehicle acceleration in the horizontal direction, when a predetermined vehicle operating condition for the first and second vehicle accelerations is satisfied, wherein the control portion determines that the predetermined vehicle operating condition for the first and second vehicle accelerations is satisfied, when the vehicle speed defined by the vehicle speed defining portion is higher than a predetermined value, and the control portion carries out the vehicle control process based on not the first vehicle acceleration in the horizontal direction but the second vehicle acceleration in the horizontal direction.

13. The in-vehicle apparatus according to the claim 1, wherein the vehicle speed defining portion defines the vehicle speed based on information from GPS.

14. The in-vehicle apparatus according to claim 2, wherein the second vehicle acceleration in the horizontal direction based on the vehicle speed and vehicle angular speed is defined based on information from a GPS.

15. The in-vehicle apparatus according to claim 3, wherein the second vehicle acceleration in the horizontal direction based on the vehicle speed and vehicle angular speed is defined based on information from a GPS.

16. The in-vehicle apparatus according to claim 4, wherein the second vehicle acceleration in the horizontal direction based on the vehicle speed and vehicle angular speed is defined based on information from a GPS.

17. The in-vehicle apparatus according to claim 5, wherein the second vehicle acceleration in the horizontal direction based on the vehicle speed and vehicle angular speed is defined based on information from a GPS.

* * * * *